(12) United States Patent
Wu et al.

(10) Patent No.: US 12,554,688 B2
(45) Date of Patent: Feb. 17, 2026

(54) DATABASE AGGREGATIONS

(71) Applicant: Notion Labs, Inc., San Francisco, CA (US)

(72) Inventors: Chenyang Wu, San Mateo, CA (US); He Lu, San Francisco, CA (US)

(73) Assignee: Notion Labs, Inc., San Francisco, CA (US)

( * ) Notice: Subject to any disclaimer, the term of this patent is extended or adjusted under 35 U.S.C. 154(b) by 0 days.

(21) Appl. No.: 18/646,586

(22) Filed: Apr. 25, 2024

(65) Prior Publication Data

US 2025/0335402 A1  Oct. 30, 2025

(51) Int. Cl.
*G06F 16/00* (2019.01)
*G06F 16/21* (2019.01)
*G06F 16/28* (2019.01)

(52) U.S. Cl.
CPC .......... *G06F 16/212* (2019.01); *G06F 16/282* (2019.01)

(58) Field of Classification Search
CPC ......... G06F 16/00; G06F 16/212; G06F 16/21
See application file for complete search history.

(56) References Cited

U.S. PATENT DOCUMENTS 10,169,380 B1 * 1/2019 Earl ...................... G06F 16/214
2004/0015489 A1 * 1/2004 Anonsen ............... G06F 16/289

* cited by examiner

*Primary Examiner* — Cheryl Lewis
(74) *Attorney, Agent, or Firm* — Perkins Coie LLP; Alberto Araiza; Anni Siitonen

(57) ABSTRACT

A system may identify a plurality of databases in a scope, to be included in an aggregated view, each database of the plurality of databases comprising data used to populate one or more blocks of an integrated workspace, each block comprising one or more properties, the one or more properties comprising at least one common property, wherein the scope is a grouping of hierarchically organized blocks of a render tree. A system may retrieve one or more blocks associated with each database. A system may harmonize a first database and a second database of the plurality of databases by determining a mapping of one or more of the first database to one or more properties of the second database. A system may generate the aggregated view of the one or more blocks, wherein the aggregated view includes a display of at least the at least one common property.

20 Claims, 17 Drawing Sheets

```
"Created by": {
  "id": "%5BJCR",
  "name": "Created by",
  "type": "created_by",
  "created_by": {}
}

"Created time": {
  "id": "XcAf",
  "name": "Created time",
  "type": "created_time",
  "created_time": {}
}

"Task due date": {
  "id": "AJP%7D",
  "name": "Task due date",
  "type": "date",
  "date": {}
}

"Last edited time": {
  "id": "jGdo",
  "name": "Last edited time",
  "type": "last_edited_time",
  "last_edited_time": {}
}

"Project description": {
  "id": "NZZ%3B",
  "name": "Project description",
  "type": "rich_text",
  "rich_text": {}
}
```

*FIG. 9*

DATABASE AGGREGATIONS

BACKGROUND

Databases can be powerful tools for organizing information. However, difficulties can arise when there is a need to simultaneously view information stored in multiple databases or multiple database tables. Existing approaches can require technical skill and can be difficult to maintain. For example, aggregated database views can break when an underlying database is modified or deleted.

Thus, there is a need for improved approaches to aggregating data across multiple databases.

BRIEF DESCRIPTION OF THE DRAWINGS

Reference will now be made, by way of example, to the accompanying drawings which show example embodiments of the present application, and in which:

FIG. 9 shows examples of various properties according to some implementations.

Figure 1:
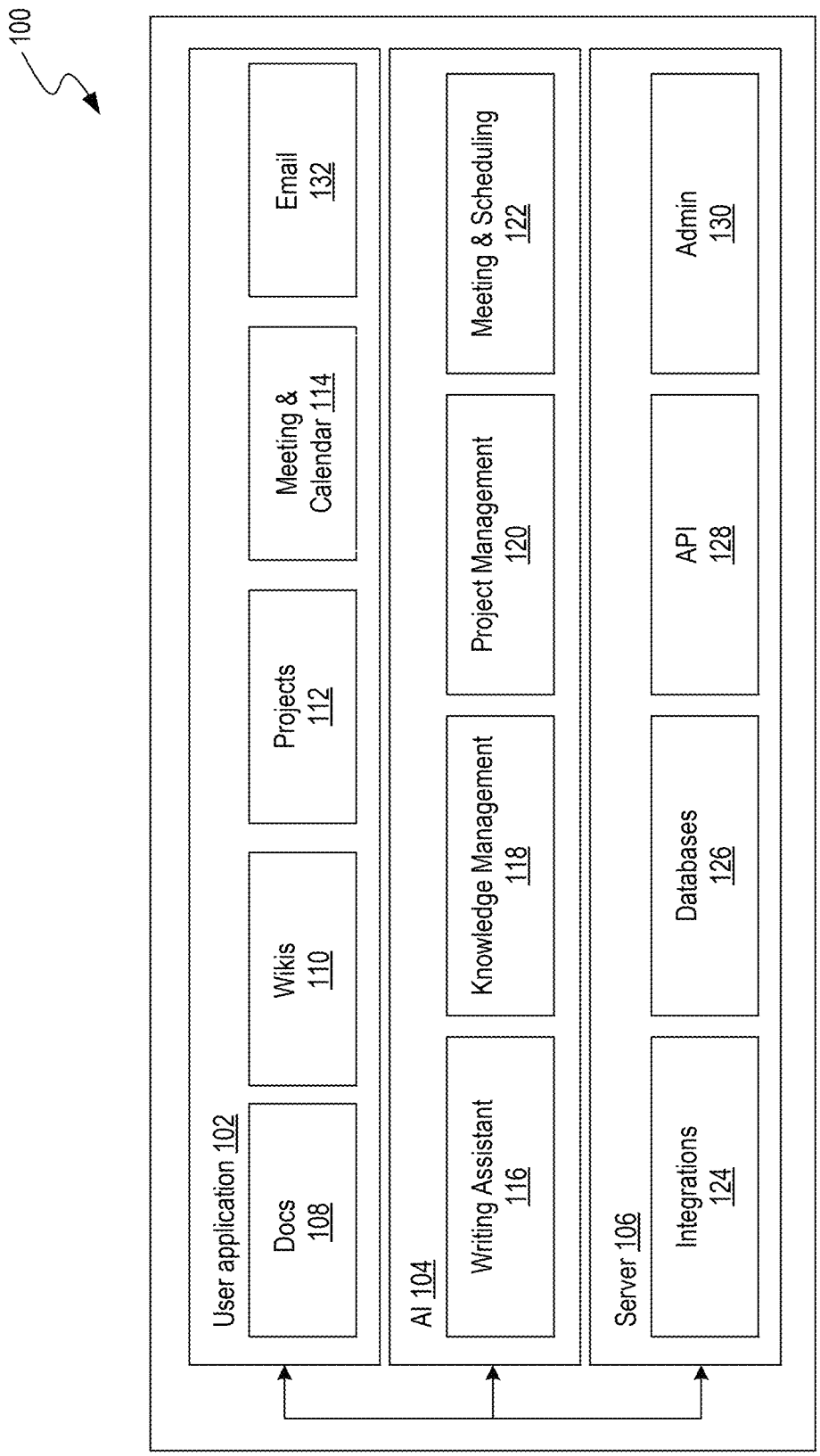
FIG. 1 is a block diagram of an example platform.

The technologies described herein will become more apparent to those skilled in the art by studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

The present disclosure describes approaches for aggregating data across multiple data sources (databases). In some implementations, data can be stored in a plurality of databases. In some implementations, databases can have database types. Database types can include, for example, project, tasks, document, meeting, wiki page, sprint, people, etc., and can define aspects of the database such as certain properties (fields) that exist in the database. In some implementations, a database can be a user-defined database and may not have a type associated therewith or may have a user-defined type.

In some implementations, a database can be a collection of blocks in an integrated workspace. A database can itself be a block and can include other blocks in the integrated workspace. A block can have one or more properties associated therewith. In some implementations, properties can be grouped into different categories. For example, some properties can be required core properties. In some implementations, required core properties can be properties that are required for a block to have a particular type (e.g., all blocks in a database with a particular database type must include certain required core properties). In some embodiments, each block in a database having a particular type can include the required core properties, but not all required core properties may be populated with a value. For example, if "due date" is a required core property for a block in a database with a "task" type, a task block can include a due date property, but the property may not have a value specified. A database type (or block type) can have one or more optional core properties. Optional core properties can be system-defined properties that may or may not be present in a block having a particular block type. In some implementations, a user can define one or more user-defined properties that can be included in a block having a user-defined block type or a system-defined block type. In some implementations, users can define required core properties and/or optional core properties for a user-defined block type and/or database type.

In some implementations, a system can be configured to aggregate blocks from multiple databases and to provide an aggregated view of blocks from the multiple databases. In some implementations, a system can provide automatic harmonization of databases, in which properties of blocks in one database are mapped to properties of blocks in another database, even though the properties may have different names. For example, if a first database has a property "due date" and a second database has a property called "due" and both accept a date, the system can infer that "due date" and "due" both refer to a due date. In some implementations, the system can display an inferred property mapping to a user, and the user can confirm the mapping, reject the mapping, and/or modify the mapping. In some implementations, mappings do not alter the underlying databases. For example, if "due" is mapped to "due date" in an aggregated view, the property can still be named "due" in the underlying database.

While a platform can provide for databases with system-defined types and system-defined properties, the present disclosure is not limited to databases that have system-defined types. In some implementations, a user can create user-defined databases. In some implementations, users can create user-defined database types. As one example, a teacher can create a database of students for each of their classes. For example, a teacher can create a page for each class, and within each page, the teacher can add a database that includes the students in that class. In some cases, the teacher may want to view all the students from all their classes together in an aggregated view.

Unlike conventional databases which tend to have rigidly-defined schemas (e.g., explicitly defined fields that rarely if ever change, specific data types that rarely or never change, etc.), databases as contemplated herein can be dynamic structures with which users routinely interact beyond merely adding, deleting, or modifying records. For example, users can easily add properties, remove properties, rename properties, rename databases, etc., from within a graphical user interface. To a user, modifying the structure, name, or schema of a database works similarly to changing a title in a word processing document or renaming, deleting, or adding a column in a spreadsheet or table within a word processing document.

A significant advantage of the approaches described herein is that database aggregations can be robust against changes to the databases included in an aggregated view. As an example, when creating an aggregated view using conventional SQL database tables, a query might look like, for example: CREATE VIEW aggregatedView AS SELECT FirstName, LastName, Class FROM db1.dbo.Stats UNION ALL SELECT First_Name as FirstName, Last_Name as LastName, Subject as Class FROM db1.dbo.Physics. In this example query, a database of students from a first class (Stats) and a second class (Physics) are being joined to create an aggregated view. In the Physics table, the field First_Name is being mapped to FirstName, the field Last_Name is being mapped to LastName, and the field Subject is being mapped to Class.

While the above example can be effective for creating an aggregated view, there are significant downsides. For example, it can be difficult for users to create such queries, and the aggregated view can break if, for example, the name of a field, database, table, etc., changes.

In some implementations, the approaches herein can provide for aggregated views that do not necessarily break when an underlying database is changed. For example, in some embodiments, a system can be configured to track database names, property names, property name mappings, etc., and can automatically update the same whenever there is a change, such that the aggregated view continues to behave as intended.

In some implementations, a block model as described herein can provide certain advantages. For example, a database can be a block that comprises multiple blocks. Each in the database can itself comprise one or more blocks. Each block and/or the properties thereof can have associated can be a unique identifier or quasi-unique identifier (e.g., an internal identifier) that does not change over time, even if a user-facing identifier (e.g., database name, property name, etc.) changes. In some implementations, an aggregated view can make use of unique identifiers rather than names for purposes of determining which databases, properties, etc., should be included in an aggregated view. Thus, even if a user changes the name of a property or database, the aggregated view can continue to operate normally and without interruption.

In some implementations, a system can be configured to automatically aggregate databases having a particular type. For example, a system can be configured to aggregate all "tasks" databases or all "project" databases in a scope. As used herein, a scope can be a collection of databases or blocks within the render tree, for example databases or blocks within a workspace, teamspace, etc.

In some implementations, a system can be configured to aggregate all records in certain databases. In some implementations, the system can apply one or more filters when creating an aggregated view. For example, in some implementations, the system can be configured to display a list of all of a user's tasks in the user's personal home or landing page. In such an implementation, the system can be configured to include only certain blocks in the aggregated view, for example only blocks where the user is mentioned, only tasks that are assigned to the user, etc.

Various approaches to database harmonization are contemplated. In some implementations, a system can use fuzzy matching to map properties based on property name. In some implementations, a system can use Levenshtein distance to map properties. Levenshtein distance can be the minimum number of single-character manipulations (e.g., insertions, deletions, substitutions) required to transform a first string into a second string. Property names with shorter Levenshtein distances can be more likely to be related. As just one example, consider a first database that has properties "First_Name" and "Last_Name" and a second database that has properties "FirstName" and "LastName." The Levenshtein distance between "First_Name" and "FirstName" is one, while the Levenshtein distance between "First_Name" and "LastName" is four (e.g., delete F, change i to L, change r to a, and delete _). Thus, in some implementations, the system can determine the First_Name and FirstName are more likely to be related than First_Name and LastName. Levenshtein distance alone may not always be sufficient to determine relationships. For example, consider the Levenshtein distance between "FirstName" and "NameFirst" or "NameLast." The Levenshtein distance between "First-Name" and "NameFirst" is 8, and the Levenshtein distance between "FirstName" and "NameLast" is also 8. In some implementations, other distance-based metrics can be used additionally or alternatively to identify related properties, such as Hamming distance, Damerau-Levenshtein distance, and so forth.

Additionally or alternatively, in some implementations, other approaches can be used for database harmonization. For example, in some implementations, a system can be configured to analyze property names and to identify substrings in property names that are shared by multiple properties. The shared substrings can indicate a possible relationship between properties. For example, a database for a retailer can include billing addresses and mailing addresses, and property names can provide an indication that certain properties are related to one another (e.g., "BillingStreet," "BillingCity," and "BillingState" are related and "MailingStreet," "MailingCity," and "MailingState" are related). In some implementations, common substrings can be useful for identifying relations within a database and/or for identifying a type of data represented by a property. In some implementations, additional and/or different analysis can be performed to improve the mapping of property names between databases.

In some implementations, a property name can be divided into substrings, and substrings can be compared to determine likely relationships. As a concrete example, consider a first database with properties "First_Name" and "Last_Name" and a second database with properties "NameFirst" and "NameLast." As described above, simple distance metrics may provide little or no insight into the relationships between the properties in the first database and the properties in the second database. The property names can be divided into substrings (e.g., by searching for non-alphabetic characters (e.g., "_" or "·"), changes in capitalization, and/or dictionary words. In some implementations, property names can be divided into n-grams, and common n-grams can be identified.

Continuing with the example, "First_Name" can be split into "First" and "Name," "Last_Name" can be split into "Last" and "Name," "NameFirst" can be split into "Name" and "First," and "NameLast" can be split into "Name" and "Last." As a next step, in some implementations, the system can identify common substrings. In the example, the properties in each database share the substring "Name," which can indicate some relationship between these properties.

In some implementations, differences in property names within a database can be considered. For example, within properties that include the word "Name," the first database and second database both have properties that include the words "First" and "Last." In some cases, the system can, based on this information, determine that the properties that include "First" and "Name" map to one another and that the properties that include "Last" and "Name" map to one another.

In some cases, common parts of property names (e.g., substrings that occur for more than one property in a database) can be dropped, and mapping can be performed based on the parts of property names that remain.

In some cases, a system may not be able to automatically determine a one-to-one mapping between properties in a first database and properties in a second database. In such cases, the system can present a plurality of possible mappings to a user, and the user can select the correct mapping or, if there is no correct mapping (for example because one database does not contain a property that corresponds to a property in another database), the user can add a property to a database or choose not to include a property in the aggregation.

In some implementations, a machine learning model can be used to map properties. For example, properties can be clustered based on their values, types, population frequency (e.g., what percentage of blocks in a database are populated with a value for the property), and so forth. Consider properties that store email addresses. While the properties may have different names, they could be clustered together because their values contain strings with similar characters and/or arrangements of characters (e.g., the symbol "@"and the symbol"·" followed by two or three characters at the end of the string).

In some implementations, automatic harmonization can include automatically determining a database type (e.g., a task database, a project database, a wiki database, a document database, etc.). Automatically determining the database type can be based on, for example, property types, the names of properties in the database (e.g., names such as "Assigned To," "Due Date," "Assignee," etc., can indicate that a database is likely to be a task database), and so forth. This can be of particular utility in the case of user-defined databases, which may, in some cases, be untyped or may have different types despite containing similar kinds of information.

In some implementations, the approaches herein can enable manual harmonization. Manual harmonization can be used, for example, in circumstances in which automatic harmonization fails either completely or partially (e.g., some properties are correctly mapped while other properties are not mapped and/or are incorrectly mapped). Using manual harmonization, a user can manually define mappings between properties in different databases.

In some implementations, a system can be configured to automatically aggregate databases within a scope. In some implementations, automatic aggregation can be based on database type. For example, if an aggregated view is a view of databases with a "project" database type and a new project database is created within the scope, the new database can be automatically added to the aggregated view.

In some implementations, an aggregated view can be a table, although other aggregated views are possible. For example, an aggregated view can be provided as a Kanban, timeline, list, cards, thumbnails, etc.

Various information can be shown in the aggregated view. For example, in some implementations, an aggregated view can show all required core properties or a subset of required core properties. In some implementations, an aggregated view can show some or all optional core properties. In some implementations, an aggregated view can show some or all user-defined properties. In some implementations, the properties that are shown in the aggregated view can be determined by the system. For example, for system-defined database types, there can be system-defined properties that are shown in the aggregated view. In some implementations, users can override and/or select properties that are shown in the aggregated view.

In some implementations, a user can select a block (e.g., a database record) in the aggregated view (e.g., a row in a table, a card, a point on a timeline, etc.) and can open a page that displays additional properties for the block. The page can include all properties of the block or a subset of the block's properties.

In some implementations, a system can be configured to generate an aggregated view of a plurality of databases, but a user may not have permission to access all the databases in the aggregated view. In some implementations, the databases to which the user does not have at least read permission can be excluded from the aggregated view presented to that user. In some implementations, the user may see some information from a database to which the user does not ordinarily have access in the aggregated view. For example, if an aggregated "tasks" view is created, the tasks view can show all the tasks assigned to the user. However, some tasks may be in databases that the user does not have access to. In some implementations, the aggregated view can show some information to the user from databases to which the user does not have access. For example, in some implementations, the aggregated view can include information about tasks that are assigned to the user in databases to which the user does not have access. In some implementations, the user can see information in the aggregated view (e.g., can see the properties shown in the aggregated view) but may not be able to open up a page that shows additional properties for the task.

Block Data Model

The disclosed technology includes a block data model ("block model"). The blocks are dynamic units of information that can be transformed into other block types and move across workspaces. The block model allows users to customize how their information is moved, organized, and shared. Hence, blocks contain information but are not siloed.

Blocks are singular pieces that represent all units of information inside an editor. In one example, text, images, lists, a row (record) in a database, etc., are all blocks in a workspace. The attributes of a block determine how the information in the block is rendered and organized. Every block can have attributes including an identifier (ID), properties, and type. Each block is uniquely identifiable by its ID. The properties can include a data structure containing custom attributes about a specific block. An example of a property is "title," which stores text content of block types such as paragraphs, lists, and the title of a page. More elaborate block types require additional or different properties, such as a page block in a database with user-defined properties. Every block can have a type, which defines how a block is displayed and how the block's properties are interpreted.

A block has attributes that define its relationship with other blocks. For example, the attribute "content" is an array (or ordered set) of block IDs representing the content inside a block, such as nested bullet items in a bulleted list or the text inside a toggle. The attribute "parent" is the block ID of a block's parent, which can be used for permissions. Blocks can be combined with other blocks to track progress and hold all project information in one place.

A block type is what specifies how the block is rendered in a user interface (UI), and the block's properties and content are interpreted differently depending on that type. Changing the type of a block does not change the block's properties or content—it only changes the type attribute. The information is thus rendered differently or even ignored if the property is not used by that block type. Decoupling property storage from block type allows for efficient transformation and changes to rendering logic and is useful for collaboration.

Blocks can be nested inside of other blocks (e.g., infinitely nested sub-pages inside of pages). The content attribute of a block stores the array of block IDs (or pointers) referencing those nested blocks. Each block defines the position and order in which its content blocks are rendered. This hierarchical relationship between blocks and their render children are referred to herein as a "render tree." In one example, page blocks display their content in a new page, instead of rendering it indented in the current page. To see this content, a user would need to click into the new page.

In the block model, indentation is structural (e.g., reflects the structure of the block tree). In other words, when a user indents something, the user is manipulating relationships between blocks and their content, not just adding a style. For example, pressing Indent in a content block can add that block to the content of the nearest sibling block in the content tree.

Blocks can inherit permissions of blocks in which they are located (which are above them in the tree). Consider a page: to read its contents, a user must be able to read the blocks within that page. However, there are two reasons one cannot use the content array to build the permissions system. First, blocks are allowed to be referenced by multiple content arrays to simplify collaboration and a concurrency model. But because a block can be referenced in multiple places, it is ambiguous which block it would inherit permissions from. The second reason is mechanical. To implement permission checks for a block, one needs to look up the tree, getting that block's ancestors all the way up to the root of the tree (which is the workspace). Trying to find this ancestor path by searching through all blocks' content arrays is inefficient, especially on the client. Instead, the model uses an "upward pointer"—the parent attribute—for the permission system. The upward parent pointers and the downward content pointers mirror each other.

A block's life starts on the client. When a user takes an action in the interface—typing in the editor, dragging blocks around a page—these changes are expressed as operations that create or update a single record. The "records" refer to persisted data, such as blocks, users, workspaces, etc. Because many actions usually change more than one record, operations are batched into transactions that are committed (or rejected) by the server as a group.

Creating and updating blocks can be performed by, for example, pressing Enter on a keyboard. First, the client defines all the initial attributes of the block, generating a new unique ID, setting the appropriate block type (e.g., to_do), and filling in the block's properties (e.g., an empty title, and checked: [["No"]]). The client builds operations to represent the creation of a new block with those attributes. New blocks are not created in isolation: blocks are also added to their parent's content array, so they are in the correct position in the content tree. As such, the client also generates an operation to do so. All these individual change operations are grouped into a transaction. Then, the client applies the operations in the transaction to its local state. New block objects are created in memory and existing blocks are modified. In native apps, the model caches all records that are accessed locally in an LRU (least recently used) cache on top of SQLite or IndexedDB, referred to as RecordCache. When records are changed on a native app, the model also updates the local copies in RecordCache. The editor re-renders to draw the newly created block onto the display. At the same time, the transaction is saved into TransactionQueue, the part of the client responsible for sending all transactions to the model's servers so that the data is persisted and shared with collaborators. TransactionQueue stores transactions safely in IndexedDB or SQLite (depending on the platform) until they are persisted by the server or rejected.

A block can be saved on a server to be shared with others. Usually, TransactionQueue sits empty, so the transaction to create the block is sent to the server in an application programming interface (API) request. In one example, the transaction data is serialized to JSON and posted to the/saveTransactions API endpoint. SaveTransactions gets the data into source-of-truth databases, which store all block data as well as other kinds of persisted records. Once the request reaches the API server, all the blocks and parents involved in the transaction are loaded. This gives a "before" picture in memory. The block model duplicates the "before" data that had just been loaded in memory. Next, the block model applies the operations in the transaction to the new copy to create the "after" data. Then the model uses both "before" and "after" data to validate the changes for permissions and data coherency. If everything checks out, all created or changed records are committed to the database-meaning the block has now officially been created. At this point, a "success" HTTP response to the original API request is sent by the client. This confirms that the client knows the transaction was saved successfully and that it can move on to saving the next transaction in the TransactionQueue. In the background, the block model schedules additional work depending on the kind of change made for the transaction. For example, the block model can schedule version history snapshots and indexing block text for a Quick Find function.

The block model also notifies MessageStore, which is a real-time updates service, about the changes that were made.

The block model provides real-time updates to, for example, almost instantaneously show new blocks to members of a teamspace. Every client can have a long-lived WebSocket connection to the MessageStore. When the client renders a block (or page, or any other kind of record), the client subscribes to changes of that record from MessageStore using the WebSocket connection. When a team member opens the same page, the member is subscribed to changes of all those blocks. After changes have been made through the saveTransactions process, the API notifies MessageStore of new recorded versions. MessageStore finds client connections subscribed to those changing records and passes on the new version through their WebSocket connection. When a team member's client receives version update notifications from MessageStore, it verifies that version of the block in its local cache. Because the versions from the notification and the local block are different, the client sends a syncRecordValues API request to the server with the list of outdated client records. The server responds with the new record data. The client uses this response data to update the local cache with the new version of the records, then re-renders the user interface to display the latest block data.

Blocks can be shared instantaneously with collaborators. In one example, a page is loaded using only local data. On the web, block data is pulled from being in memory. On native apps, loading blocks that are not in memory are loaded from the RecordCache persisted storage. However, if missing block data is needed, the data is requested from an API. The API method for loading the data for a page is referred to herein as loadPageChunk; it descends from a starting point (likely the block ID of a page block) down the content tree and returns the blocks in the content tree plus any dependent records needed to properly render those blocks. Several layers of caching for loadPageChunk are used, but in the worst case, this API might need to make multiple trips to the database as it recursively crawls down the tree to find blocks and their record dependencies. All data loaded by loadPageChunk is put into memory (and saved in the RecordCache if using the app). Once the data is in memory, the page is laid out and rendered using React.

Software Platform

FIG. 1 is a block diagram of an example platform 100. The platform 100 provides users with an all-in-one workspace for data and project management. The platform 100 can include a user application 102, an AI tool 104, and a server 106. The user application 102, the AI tool 104, and the server 106 are in communication with each other via a network.

In some implementations, the user application 102 is a cross-platform software application configured to work on several computing platforms and web browsers. The user application 102 can include a variety of templates. A template refers to a prebuilt page that a user can add to a workspace within the user application 102. The templates can be directed to a variety of functions. Exemplary templates include a docs template 108, a wikis template 110, a projects template 112, a meeting and calendar template 114, and an email template 132. In some implementations, a user can generate, save, and share customized templates with other users.

The user application 102 templates can be based on content "blocks." For example, the templates of the user application 102 include a predefined and/or pre-organized set of blocks that can be customized by the user. Blocks are content containers within a template that can include text, images, objects, tables, maps, and/or other pages (e.g., nested pages or sub-pages). Blocks can be assigned to certain properties. The blocks are defined by boundaries having dimensions. The boundaries can be visible or non-visible for users. For example, a block can be assigned as a text block (e.g., a block including text content), a heading block (e.g., a block including a heading) or a sub-heading block having a specific location and style to assist in organizing a page. A block can be assigned as a list block to include content in a list format. A block can be assigned as an AI prompt block (also referred to as a "prompt block") that enables a user to provide instructions (e.g., prompts) to the AI tool 104 to perform functions. A block can also be assigned to include audio, video, or image content.

A user can add, edit, and remove content from the blocks. The user can also organize the content within a page by moving the blocks around. In some implementations, the blocks are shared (e.g., by copying and pasting) between the different templates within a workspace. For example, a block embedded within multiple templates can be configured to show edits synchronously.

The docs template 108 is a document generation and organization tool that can be used for generating a variety of documents. For example, the docs template 108 can be used to generate pages that are easy to organize, navigate, and format. The wikis template 110 is a knowledge management application having features similar to the pages generated by the docs template 108 but that can additionally be used as a database. The wikis template 110 can include, for example, tags configured to categorize pages by topic and/or include an indication of whether the provided information is verified to indicate its accuracy and reliability. The projects template 112 is a project management and note-taking software tool. The projects template 112 can allow the users, either as individuals or as teams, to plan, manage, and execute projects in a single forum. The meeting and calendar template 114 is a tool for managing tasks and timelines. In addition to traditional calendar features, the meeting and calendar template 114 can include blocks for categorizing and prioritizing scheduled tasks, generating to-do and action item lists, tracking productivity, etc. The various templates of the user application 102 can be included under a single workspace and include synchronized blocks. For example, a user can update a project deadline on the projects template 112, which can be automatically synchronized to the meeting and calendar template 114. The various templates of the user application 102 can be shared within a team, allowing multiple users to modify and update the workspace concurrently.

The email template 132 allows the users to customize their inbox by representing the inbox as a customizable database where the user can add custom columns and create custom views with layouts. One view can include multiple layouts including a calendar layout, a summary layout, and urgent information layout. Each view can include a customized structure including custom criteria, custom properties, and custom actions. The custom properties can be specific to a view such as artificial intelligence-extracted properties, and/or heuristic-based properties. The custom actions can trigger automatically when a message enters the view. The custom actions can include deterministic rules like "Archive this," or assistant workflows like responding to support messages by searching user applications 102 or filing support tickets. In addition, the view can include actions, such as buttons, that are custom to the view and perform operations on the messages in the inbox. Only the customized structure can be shared with other users of the system, or both the customized structure and the messages can be shared.

The AI tool 104 is an integrated AI assistant that enables AI-based functions for the user application 102. In one example, the AI tool 104 is based on a neural network architecture, such as the transformer 212 described in FIG. 2. The AI tool 104 can interact with blocks embedded within the templates on a workspace of the user application 102. For example, the AI tool 104 can include a writing assistant tool 116, a knowledge management tool 118, a project management tool 120, and a meeting and scheduling tool 122. The different tools of the AI tool 104 can be interconnected and interact with different blocks and templates of the user application 102.

The writing assistant tool 116 can operate as a generative AI tool for creating content for the blocks in accordance with instructions received from a user. Creating the content can include, for example, summarizing, generating new text, or brainstorming ideas. For example, in response to a prompt received as a user input that instructs the AI to describe what the climate is like in New York, the writing assistant tool 116 can generate a block including a text that describes the climate in New York. As another example, in response to a prompt that requests ideas on how to name a pet, the writing assistant tool 116 can generate a block including a list of creative pet names. The writing assistant tool 116 can also operate to modify existing text. For example, the writing assistant can shorten, lengthen, or translate existing text, correct grammar and typographical errors, or modify the style of the text (e.g., a social media style versus a formal style).

The knowledge management tool 118 can use AI to categorize, organize, and share knowledge included in the workspace. In some implementations, the knowledge management tool 118 can operate as a question-and-answer assistant. For example, a user can provide instructions on a prompt block to ask a question. In response to receiving the question, the knowledge management tool 118 can provide an answer to the question, for example, based on information included in the wikis template 110. The project management tool 120 can provide AI support for the projects template 112. The AI support can include auto filling information based on changes within the workspace or automatically track project development. For example, the project management tool 120 can use AI for task automation, data analysis, real-time monitoring of project development, allocation of resources, and/or risk mitigation. The meeting and scheduling tool 122 can use AI to organize meeting notes, unify meeting records, list key information from meeting minutes, and/or connect meeting notes with deliverable deadlines.

The server 106 can include various units (e.g., including compute and storage units) that enable the operations of the AI tool 104 and workspaces of the user application 102. The server 106 can include an integrations unit 124, an application programming interface (API) 128, databases 126, and an administration (admin) unit 130. The databases 126 are configured to store data associated with the blocks. The data associated with the blocks can include information about the content included in the blocks, the function associated with the blocks, and/or any other information related to the blocks. The API 128 can be configured to communicate the block data between the user application 102, the AI tool 104, and the databases 126. The API 128 can also be configured to communicate with remote server systems, such as AI systems. For example, when a user performs a transaction within a block of a template of the user application 102 (e.g., in a docs template 108), the API 128 processes the transaction and saves the changes associated with the transaction to the database 126. The integrations unit 124 is a tool connecting the platform 200 with external systems and software platforms. Such external systems and platforms can include other databases (e.g., cloud storage spaces), messaging software applications, or audio or video conference applications. The administration unit 130 is configured to manage and maintain the operations and tasks of the server 106. For example, the administration unit 130 can manage user accounts, data storage, security, performance monitoring, etc.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification, etc.) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from online webpages and/or publicly available social media posts. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data can be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed, and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses LLMs.

A language model can use a neural network (typically a DNN) to perform natural language processing (NLP) tasks. A language model can be trained to model how words relate to each other in a textual sequence, based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input).

Although transformer-based language models are described herein, it should be understood that the present disclosure may be applicable to any ML-based language model, including language models based on other neural network architectures such as recurrent neural network (RNN)-based language models.

Figure 2:
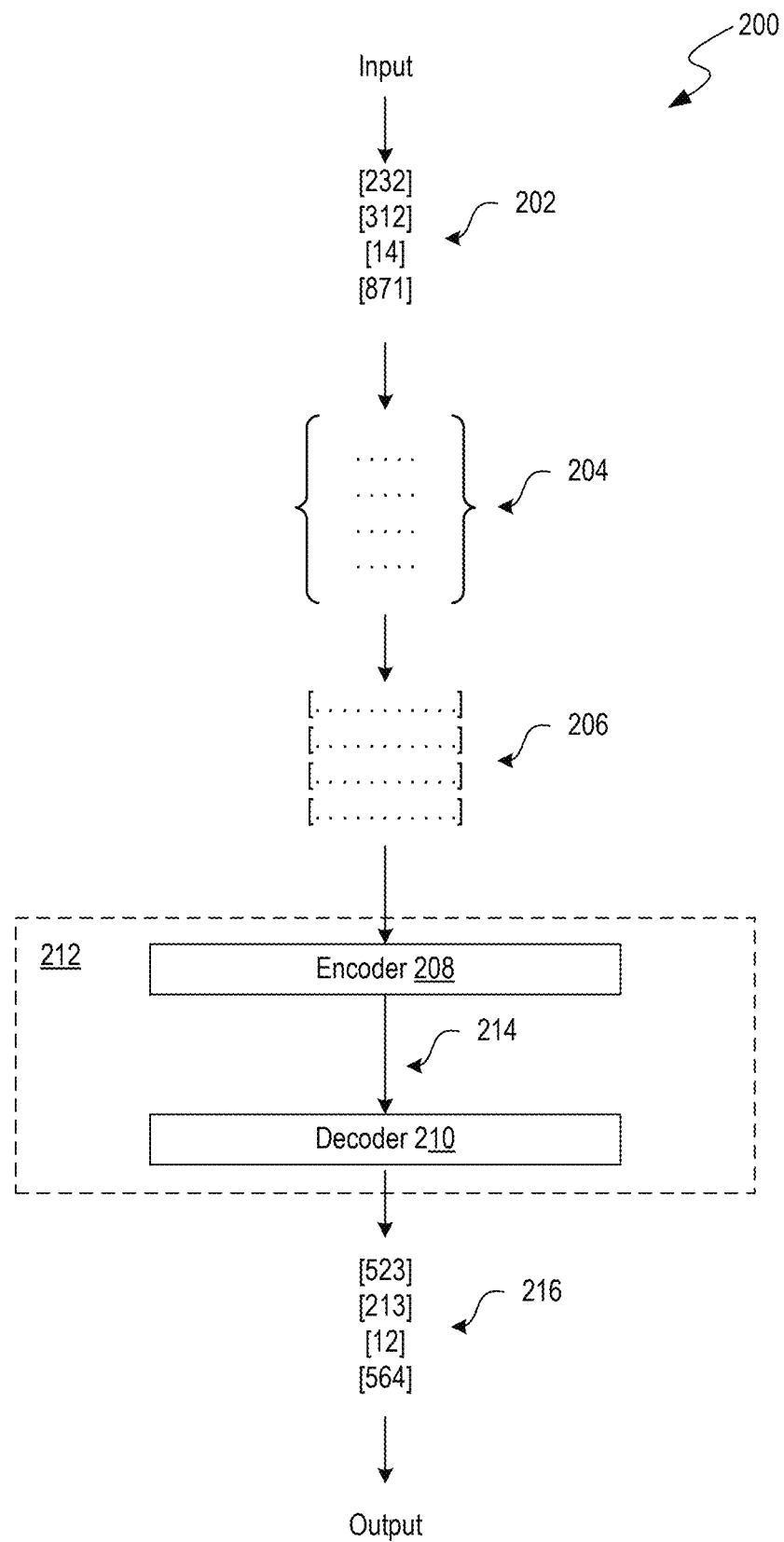
FIG. 2 is a block diagram of an example transformer.

FIG. 2 is a block diagram of an example transformer 212. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as recurrent neural network (RNN)-based language models.

The transformer 212 includes an encoder 208 (which can include one or more encoder layers/blocks connected in series) and a decoder 210 (which can include one or more decoder layers/blocks connected in series). Generally, the encoder 208 and the decoder 210 each include multiple neural network layers, at least one of which can be a self-attention layer. The parameters of the neural network layers can be referred to as the parameters of the language model.

The transformer 212 can be trained to perform certain functions on a natural language input. Examples of the functions include summarizing existing content, brainstorming ideas, writing a rough draft, fixing spelling and grammar, and translating content. Summarizing can include extracting key points or themes from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 212 is trained to perform certain functions on other input formats than natural language input. For example, the input can include objects, images, audio content, or video content, or a combination thereof.

The transformer 212 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 2 illustrates an example of how the transformer 212 can process textual input data. Input to a language model (whether transformer-based or otherwise) typically is in the form of natural language that can be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], 14, and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 2, a short sequence of tokens 202 corresponding to the input text is illustrated as input to the transformer 212. Tokenization of the text sequence into the tokens 202 can be performed by some pre-processing tokenization module such as, for example, a byte-pair encoding tokenizer (the "pre" referring to the tokenization occurring prior to the processing of the tokenized input by the LLM), which is not shown in FIG. 2 for brevity. In general, the token sequence that is inputted to the transformer 212 can be of any length up to a maximum length defined based on the dimensions of the transformer 212. Each token 202 in the token sequence is converted into an embedding vector 206 (also referred to as "embedding 206").

An embedding 206 is a learned numerical representation (such as, for example, a vector) of a token that captures some semantic meaning of the text segment represented by the token 202. The embedding 206 represents the text segment corresponding to the token 202 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 206 corresponding to the "write" token will be closer to another embedding corresponding to the "jot down" token in the vector space as compared to the distance between the embedding 206 corresponding to the "write" token and another embedding corresponding to the "summary" token.

The vector space can be defined by the dimensions and values of the embedding vectors. Various techniques can be used to convert a token 202 to an embedding 206. For example, another trained ML model can be used to convert the token 202 into an embedding 206. In particular, another trained ML model can be used to convert the token 202 into an embedding 206 in a way that encodes additional information into the embedding 206 (e.g., a trained ML model can encode positional information about the position of the token 202 in the text sequence into the embedding 206). In some implementations, the numerical value of the token 202 can be used to look up the corresponding embedding in an embedding matrix 204, which can be learned during training of the transformer 212.

The generated embeddings 206 are input into the encoder 208. The encoder 208 serves to encode the embeddings 206 into feature vectors 214 that represent the latent features of the embeddings 206. The encoder 208 can encode positional information (i.e., information about the sequence of the input) in the feature vectors 214. The feature vectors 214 can have very high dimensionality (e.g., on the order of thousands or tens of thousands), with each element in a feature vector 214 corresponding to a respective feature. The numerical weight of each element in a feature vector 214 represents the importance of the corresponding feature. The space of all possible feature vectors 214 that can be generated by the encoder 208 can be referred to as a latent space or feature space.

Conceptually, the decoder 210 is designed to map the features represented by the feature vectors 214 into meaningful output, which can depend on the task that was assigned to the transformer 212. For example, if the transformer 212 is used for a translation task, the decoder 210 can map the feature vectors 214 into text output in a target language different from the language of the original tokens 202. Generally, in a generative language model, the decoder 210 serves to decode the feature vectors 214 into a sequence of tokens. The decoder 210 can generate output tokens 216 one by one. Each output token 216 can be fed back as input to the decoder 210 in order to generate the next output token 216. By feeding back the generated output and applying self-attention, the decoder 210 can generate a sequence of output tokens 216 that has sequential meaning (e.g., the resulting output text sequence is understandable as a sentence and obeys grammatical rules). The decoder 210 can generate output tokens 216 until a special [EOT] token (indicating the end of the text) is generated. The resulting sequence of output tokens 216 can then be converted to a text sequence in post-processing. For example, each output token 216 can be an integer number that corresponds to a vocabulary index. By looking up the text segment using the vocabulary index, the text segment corresponding to each output token 216 can be retrieved, the text segments can be concatenated together, and the final output text sequence can be obtained.

In some implementations, the input provided to the transformer 212 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to the question, text associated with the request, or a list of ideas associated with the request. For example, the input can include the question "What is the weather like in San Francisco?" and the output can include a description of the weather in San Francisco. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via an API (e.g., the API 128 in FIG. 1). As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Hierarchical Organizational Blocks in a Workspace

Figure 3:
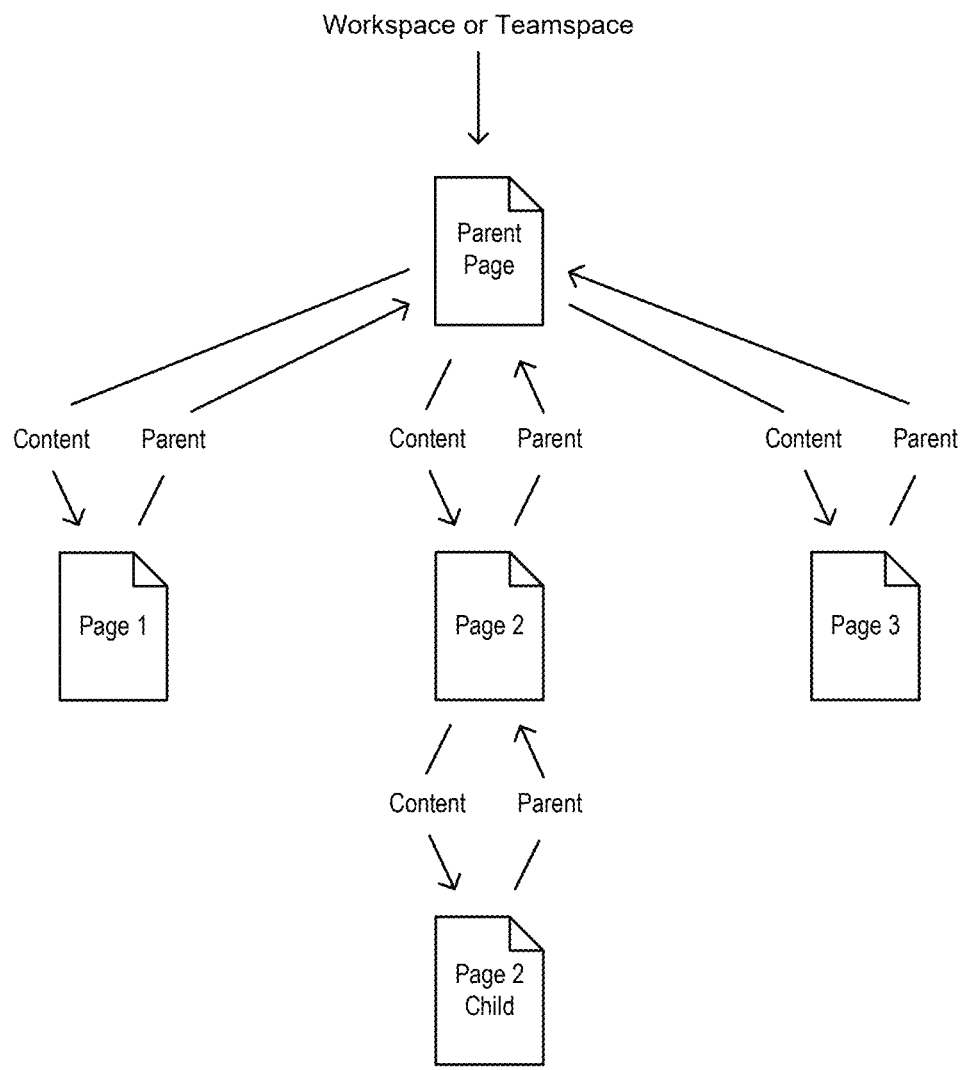
FIG. 3 is a block diagram illustrating a hierarchical organization of pages in a workspace.

FIG. 3 is a block diagram illustrating a hierarchical organization of pages in a workspace. As described with respect to the block data model of the present technology, a workspace can include multiple pages (e.g., page blocks). The pages (e.g., including parent pages and child or nested pages) can be arranged hierarchically within the workspace or one or more teamspaces, as shown in FIG. 3. The page can include a block such as tabs, lists, images, tables, etc.

A teamspace can refer to a collaborative space associated with a team or an organization that is hierarchically below a workspace. For example, a workspace can include a teamspace accessible by all users of an organization and multiple teamspaces that are accessible by users of different teams. Accessibility generally refers to creating, editing, and/or viewing content (e.g., pages) included in the workspace or the one or more teamspaces.

In the hierarchical organization illustrated in FIG. 3, a parent page (e.g., "Parent Page") is located hierarchically below the workspace or a teamspace. The parent page includes three children pages (e.g., "Page 1," "Page 2," and "Page 3"). Each of the child pages can further include subpages (e.g., "Page 2 Child" which is a grandchild of "Parent Page" and child of "Page 2"). The "Content" arrows in FIG. 3 indicate the relationship between the parents and children while the "Parent" arrows indicate the inheritance of access permissions. The child pages inherit access permission from the (immediate) parent page under which they are located hierarchically (e.g., which is above them in the tree). For example, "Page 2" inherited the access permission of the "Parent page" as a default when it was created under its parent page. Similarly, "Page 2 Child" inherited the access permission of the parent page as a default when it was created under its parent page. "Parent Page," "Page 2," and "Page 2 Child" thereby have the same access permission within the workspace.

The relationships and organization of the content can be modified by changing the location of the pages. For example, when a child page is moved to be under a different parent, the child page's access permission modifies to correspond to the access permission of the new parent. Also, when the access permission of "Parent Page" is modified, the access permission of "Page 1," "Page 2," and "Page 3" can be automatically modified to correspond to the access permission of "Parent Page" based on the inheritance character of access permissions.

In contrast, however, a user can modify the access permission of the children independently of their parents. For example, the user can modify the access permission of "Page 2 Child" in FIG. 3 so that it is different from the access permission of "Page 2" and "Parent Page." The access permission of "Page 2 Child" can be modified to be broader or narrower than the access permission of its parents. As an example, "Page 2 Child" can be shared on the internet while "Page 2" is only shared internally to the users associated with the workspace. As another example, "Page 2 Child" can be shared only with an individual user while "Page 2" is shared with a group of users (e.g., a team of the organization associated with the workspace). In some implementations, the hierarchical inheritance of the access permissions described herein can be modified from the previous description. For example, the access permissions of all the pages (parent and children) can be defined as independently changeable.

Example Data Aggregations Embodiments

Figure 4:
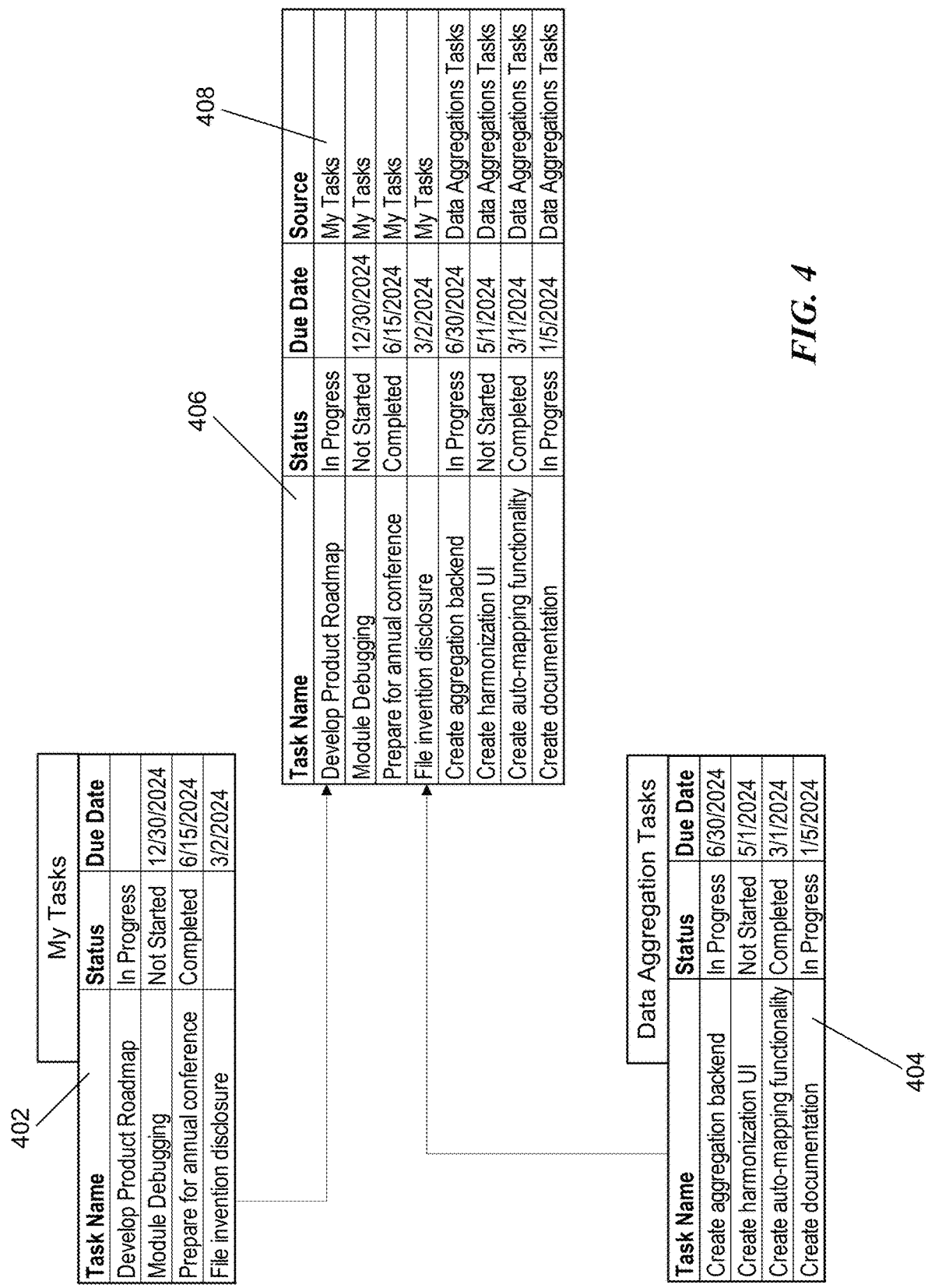
FIG. 4 is a diagram that illustrates an example of database aggregation according to some implementations.

FIG. 4 is a diagram that illustrates an example of database aggregation according to some implementations. In FIG. 4, a relatively straightforward database aggregation is depicted. A first database 402 and a second database 404 can be databases having a same database type (e.g., task). In FIG. 4, the first database 402 and second database 404 include required core properties: task name, status, and due date. A system can be configured to generate an aggregated view 406 that combines the data in the first database 402 and the second database 404 into a single view. The aggregated view 406 can display the required core properties. In some implementations, the aggregated view 406 can include a column 408 that shows the source of each page in the aggregated view. For example, in FIG. 4, the first four pages originate from the "My Tasks" database (e.g., the first database 402) while the last four pages originate from the "Data Aggregation Tasks" database (e.g., the second database 404).

Aggregation as depicted in FIG. 4 can be straightforward as both databases have the same type and thus have the same required core properties, which can be included in the aggregated view. However, as described herein, more complex data aggregations are possible.

Figure 5:
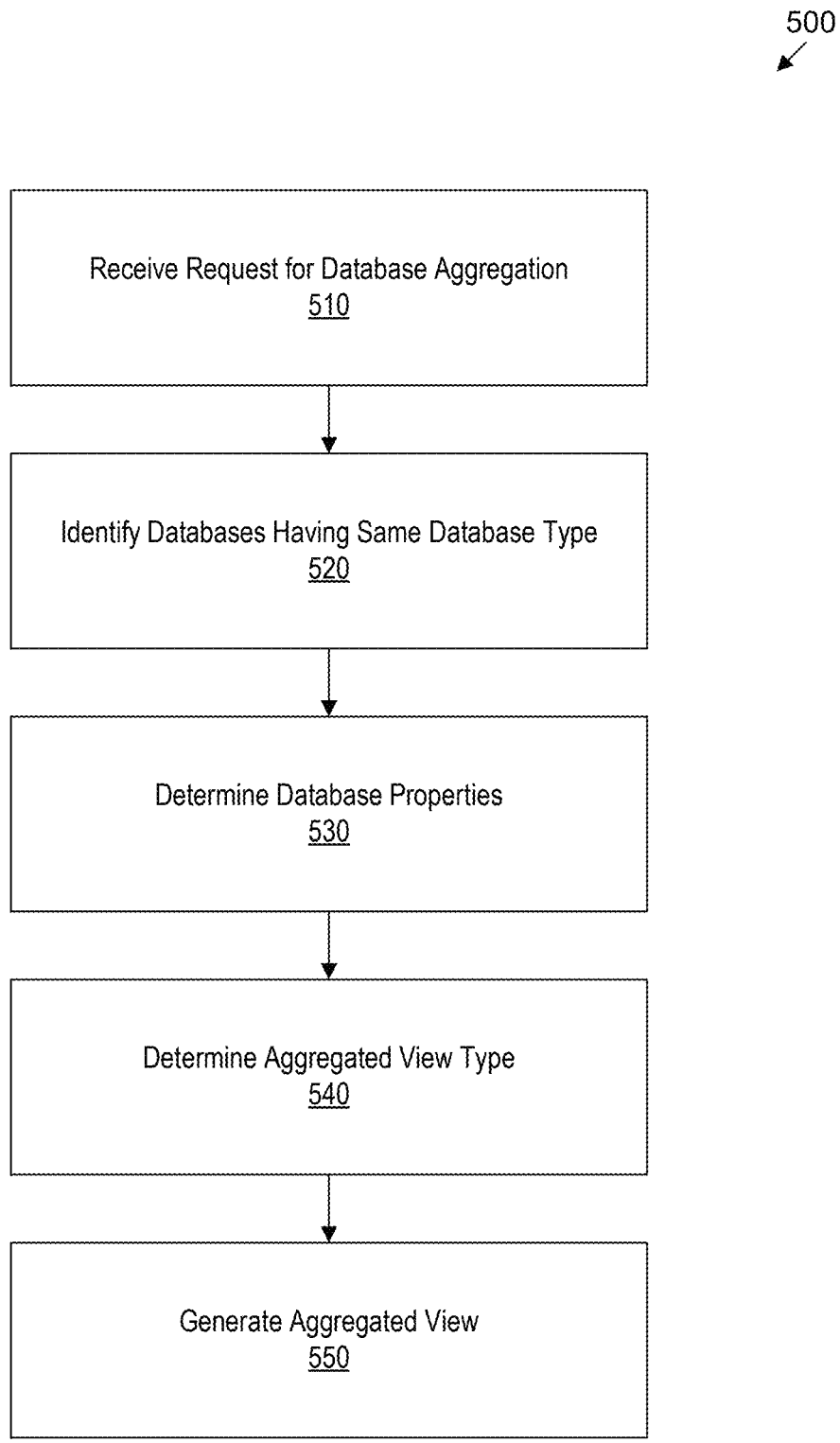
FIG. 5 is a block diagram that illustrates an example aggregation process according to some implementations.

FIG. 5 is a block diagram that illustrates an example aggregation process according to some implementations. The process 500 can be performed by a computer system. At operation 510, the system can receive a request for database aggregation. In FIG. 5, it is contemplated that the request is for database aggregation of databases having a particular database type. In some implementations, the request can include a database type and/or a scope. In some implementations, a scope may not be specified, and the system can search an entire workspace. At operation 520, the system can identify databases within the scope (or workspace, if no scope is specified) having the database type. At operation 530, the system can determine properties of one or more identified databases. The properties can include required core properties, optional core properties, user-defined properties, and/or generic properties. In some implementations, the system can automatically select required core properties for inclusion in the aggregated view. In some implementations, a user can specify which properties should be shown in the aggregated view. For example, a user may want to display one or more required core properties, one or more optional core properties, one or more generic properties, and/or one or more user-defined properties. At operation 540, the system can determine an aggregated view type. In some implementations, the user can specify an aggregated view type, for example in the request or in response to a prompt from the system that accepts an input of an aggregated view type. In some implementations, the view type can be determined automatically, for example based on the database type. A view type can include, for example, a tabular view, a timeline, a Kanban board, etc. At operation 550, the system can generate the aggregated view. The aggregated view can be displayed in various locations. In some implementations, a user can specify where the aggregated view should be displayed, for example a page where the aggregated view should be displayed.

Figure 6:
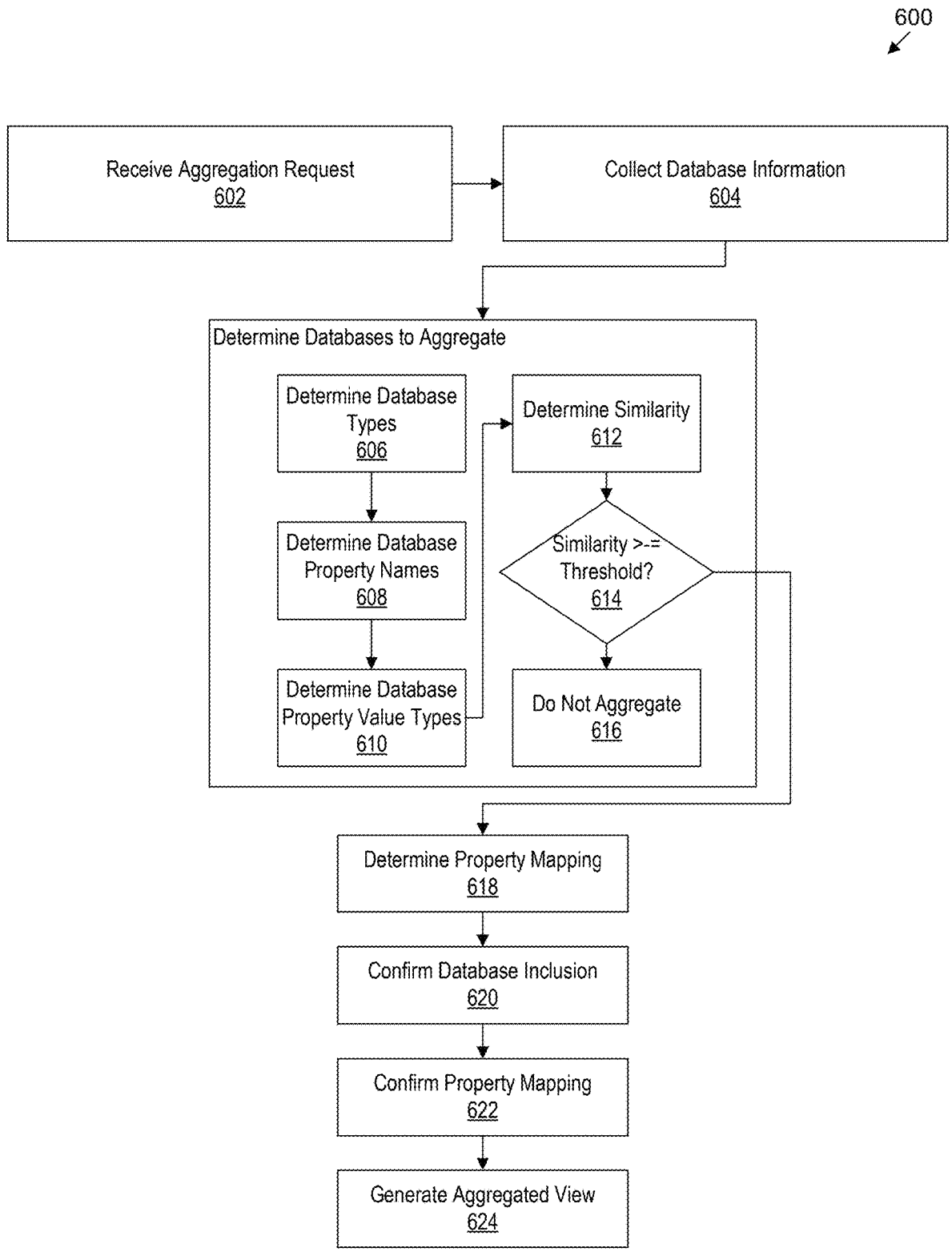
FIG. 6 illustrates an example aggregation process according to some implementations.

FIG. 6 illustrates an example aggregation process according to some implementations. The process 600 illustrated in FIG. 6 can be performed by a computer system. At operation 602, the system can receive an aggregation request from a user. At operation 604, the system can collect information about a plurality of databases (e.g., a plurality of databases in a workspace, teamspace, etc.). At operations 606-616, the system can determine databases to aggregate. At operation 606, the system can determine a database type for each database of the plurality of databases. In some implementations, this information can be sufficient for determining which databases to aggregate. For example, databases having the same database type can be aggregated. As described herein, in some cases, not all databases may have a type, thus reliance on database type alone can be insufficient for identifying all databases that could be aggregated. At operation 608, the system can determine the property names for properties in each database of the plurality of databases. At operation 610, the system can determine property value types for the properties of each database of the plurality of databases. The property value types can be, for example, text, binary, date, numeric, currency, Boolean, list (e.g., property values can be selected from a list of possible property values), etc. At operation 612, the system can, using the property names and/or the property value types, determine the similarity between one or more databases. At decision point 614, if the similarity of two databases is determined to be below a threshold value, the process can end at operation 616 and the two databases may not be aggregated. If, at decision point 614, the similarity is greater than or equal to a threshold value, the process can continue. At operation 618, the system can determine a property mapping between databases. In some implementations, the property mapping can be carried out as part of the process for determining databases to aggregate, for example prior to or when determining the similarity of databases at operation 612. At operation 620, the system can confirm which databases should be included in an aggregated view. For example, the system can provide a user interface that requests for the user to confirm which databases should be included in the aggregated view. At operation 622, the system can confirm the property mappings. For example, the system can provide a user interface that displays an automatically determined property mapping and asks the user to confirm, reject, and/or modify the property mapping. At operation 624, the system can generate the aggregated view.

Figure 7:
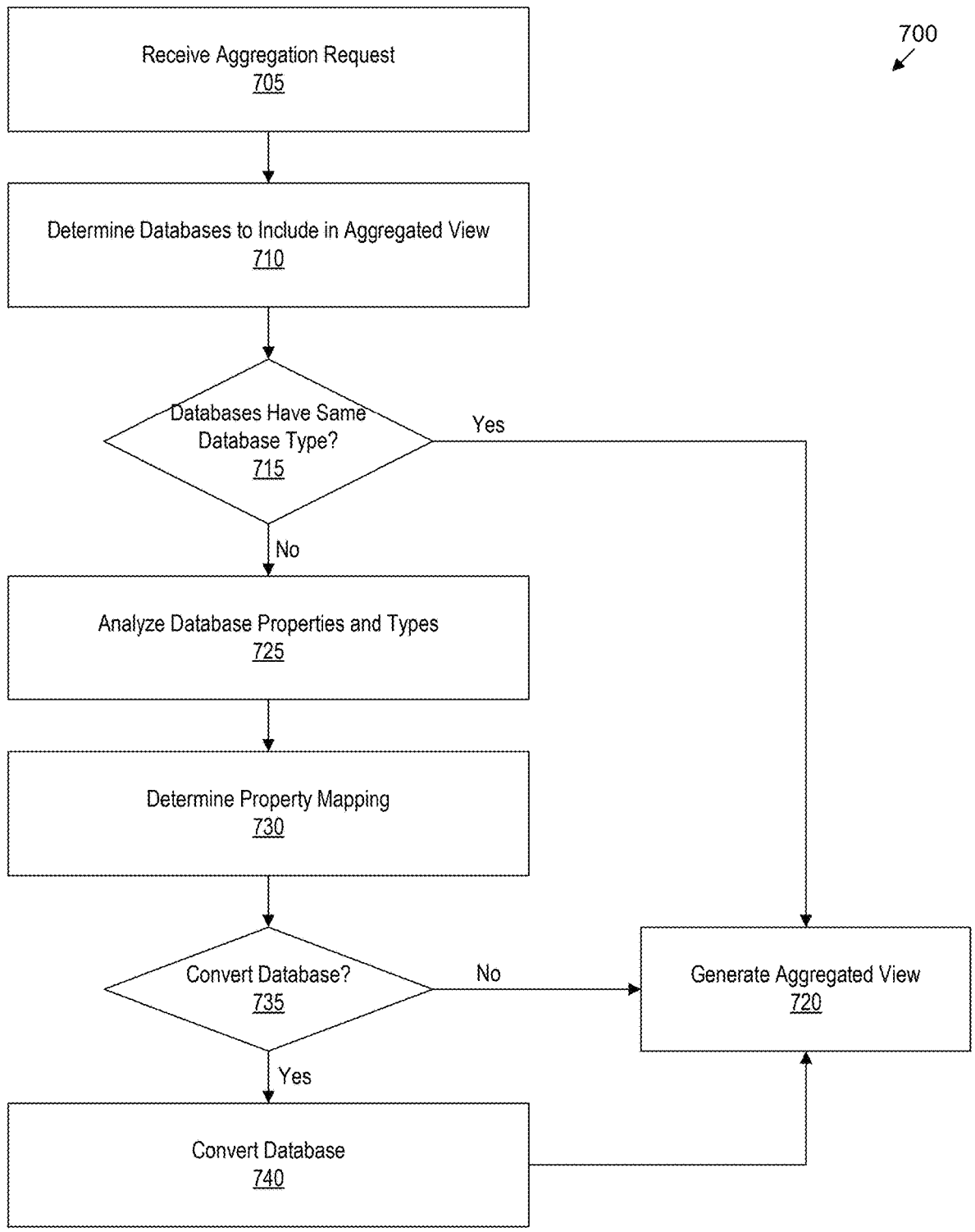
FIG. 7 is a block diagram that illustrates an example process for database aggregation according to some implementations.

FIG. 7 is a block diagram that illustrates an example process for database aggregation according to some implementations. The process 700 can be performed by a computer system. At operation 705, the system can receive an aggregation request from a user. At operation 710, the system can determine databases to include in an aggregated view. For example, in some implementations, a user can select an aggregation function when viewing or editing a particular database, and the system can automatically suggest databases with the same database type or with similar database schemas. In some implementations, a user can specify which databases to include in the aggregation. At decision point 715, the system can determine if all the selected databases have the same database type. If so, at operation 720, the system can generate an aggregated view. In some implementations, the system can receive a user selection of one or more properties to display in the aggregated view. If, at decision point 715, not all selected databases have the same type, the system can analyze the properties of the selected databases and/or the types of the selected databases (if one or more of the selected databases have a database type) at operation 725. At operation 730, the system can, based on the analysis, determine a mapping between properties of the selected databases. At decision point 735, the system can determine whether or not to convert a database (for example, to convert an untyped database to a typed database, to convert a typed database to another data type, or to convert a typed database to an untyped database). As just one example, a user may have created a untyped database for tracking tasks, and the system can give the user the option of converting the untyped database to a database with a "task" type. If the user does not want to convert any of the selected databases, the system can generate an aggregated view at operation 720. If the user does want to convert at least one database, the system can, at operation 740, convert the at least one database. Converting the at least one database can include, for example, renaming one or more properties, adding one or more properties, etc. At operation 720, the system can generate an aggregated view.

Figure 8:
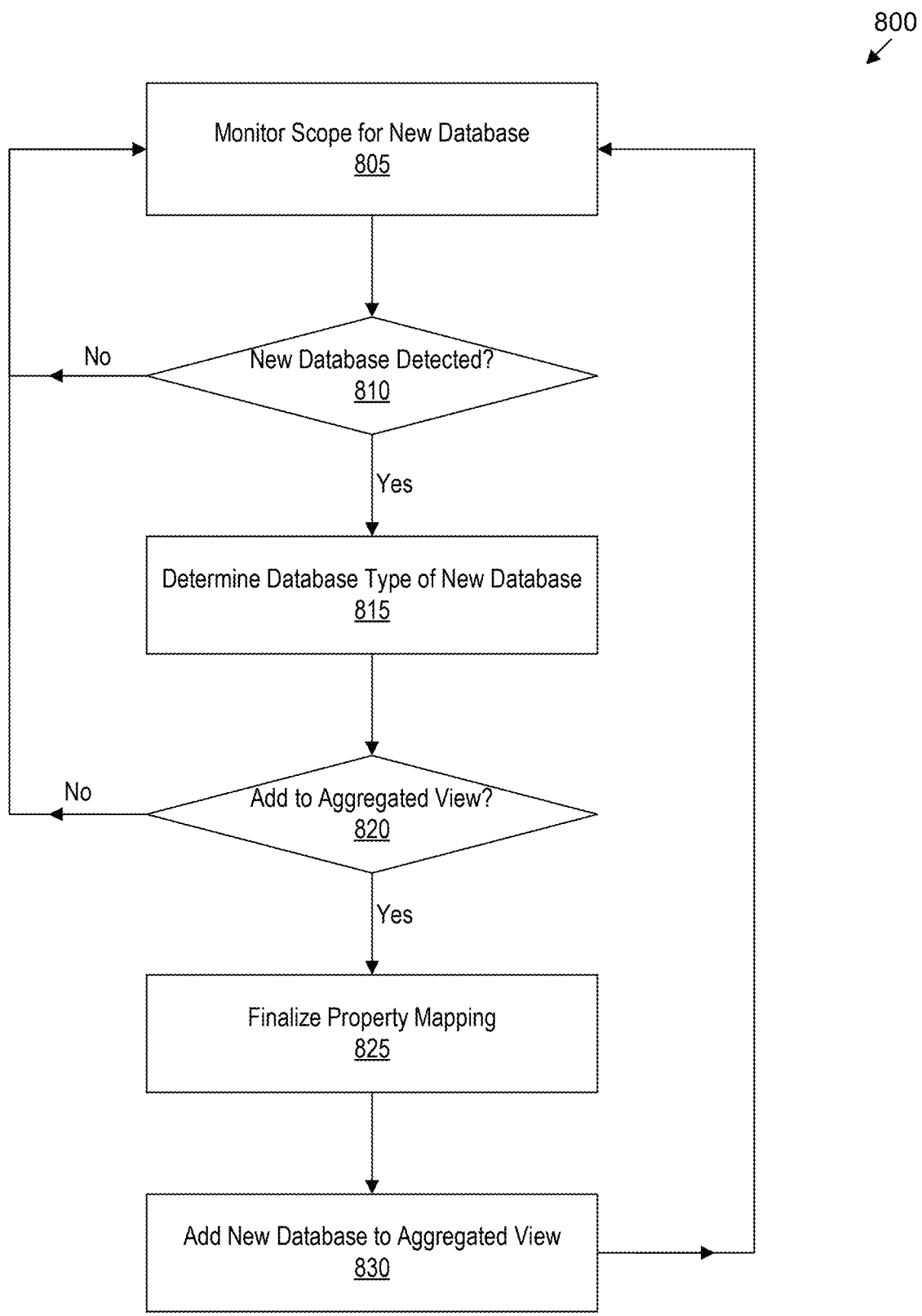
FIG. 8 is a diagram that illustrates an example process for automatically updating a database aggregation according to some implementations.

FIG. 8 is a diagram that illustrates an example process for automatically updating a database aggregation according to some implementations. The process 800 can be performed by a computer system. At operation 805, the system can monitor a scope (e.g., workspace, teamspace, etc.) for the creation of new databases. At decision point 810, if no new database is detected, the system can continue to monitor the scope at operation 805. If a new database is detected, at operation 815, the system can determine a database type of the new database. As described herein, in some cases, the database type can be a defined database type. In some cases, the database type can be inferred, for example using the database type inference approaches described herein. At decision point 820, the system can determine whether or not to add the new database to an aggregated view. If not, the system can continue monitoring the scope at operation 805. If so, at operation 825, the system can finalize the property mapping. In some implementations, the system can skip operation 825, for example in cases where the mapping is clear, for example because the databases are identified as included in the aggregated view because they have the same database type. In some implementations, the system can present a user interface to a user that indicates there is a new database to be added to the aggregated view, and the user can confirm the property mapping and/or that the new database should be added to the aggregated view. At operation 830, the system can add the new database to the aggregated view.

While depicted as a serialized process in FIG. 8, it will be appreciated that the process 800 can include parallel processing. For example, in some implementations, a first computer process can monitor the scope for new databases, and a second computer process can simultaneously analyze and/or add the new database to the aggregated view.

As described herein, in some implementations, database properties can have one or more identifiers. In some implementations, a database property can have an external identifier and an internal identifier. The external identifier can be, for example, a name of the property that is displayed to a user. The internal identifier can be, for example, a unique or quasi-unique (e.g., unique within a given database, but not necessarily within a larger context such as a workspace). In some cases, the internal identifier can be a human-readable identifier, though this need not be the case. For example, in some cases, an internal identifier can be a random string.

FIG. 9 shows examples of various properties according to some implementations. As shown in FIG. 9, a property can have an identifier (id) which can be an internal identifier. The property can have an external identifier (name) that is displayed in user-facing scenarios. In some implementations, name can be used when querying databases, aggregating databases, and so forth. In some implementations, as described herein, using an internal identifier (id) for queries, aggregations, etc., can be advantageous as it can ensure that queries, aggregations, etc., continue to operate even if a user changes the name of a property. In some implementations, a property can have a type. For example, as shown in FIG. 9, a property can have a type of created_by, created_time, date, last_edited_time, or rich_text. Other property types are possible including, for example and without limitation, checkbox, email, files, formula, last_edited_by, multi-select, number, people, phone_number, relation, rollup, select, status, title, or url. Some property types can cause a property to be automatically populated for a page. For example, a property with a "created_by" type can be automatically populated with the name of a user who created the page, a property of type last_edited_time can be automatically populated with the last time the page was edited, and so forth. In some implementations, a property definition can include a format. For example, a property with a type of "number" can have a format of "currency," which can affect how the property value is displayed to the user. In some implementations, a property definition can include allowed values, allowed ranges, etc. For example, a property with a type of "select" can have one or more selection options that a user can select from to populate the property value. Additional property configuration can be possible, such as setting a background color based on value. In some implementations, a system can be configured to validate values based on property type, for example to ensure that a "url" value is a valid URL, that an email address includes one or more characters, followed by the "@" symbol, followed by one or more characters, followed by a period, and ending in a top-level domain. In some implementations, a property can have a default value.

Figure 10:
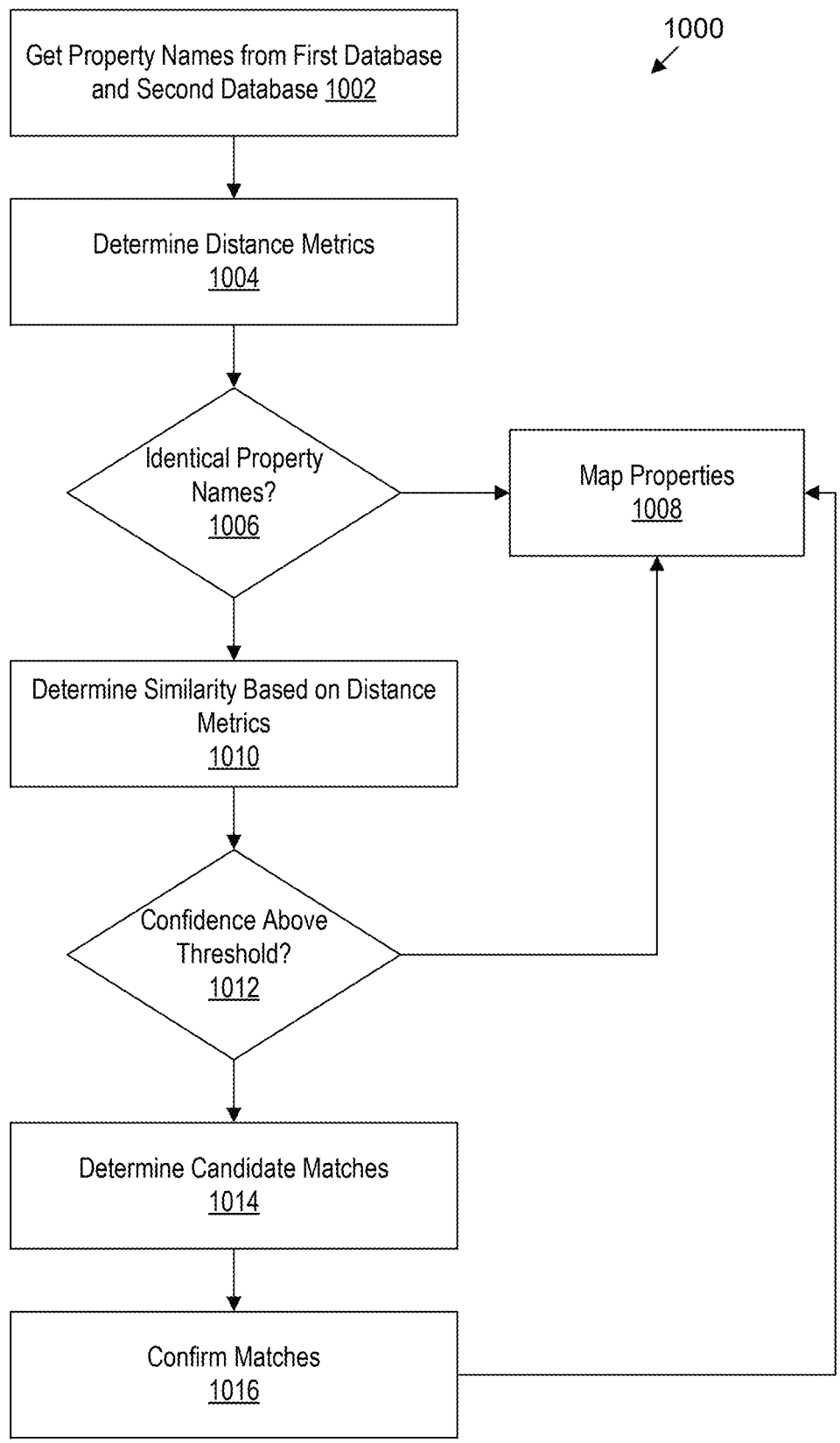
FIG. 10 is a block diagram that illustrates an example process for mapping properties between databases using distance metrics according to some implementations.

FIG. 10 is a block diagram that illustrates an example process for mapping properties between databases using distance metrics according to some implementations. The process 1000 can be performed by a computer system. In the following discussion, two databases are assumed for simplicity and ease of understanding, but it will be appreciated that the process 1000 can be readily expanded to include more than two databases.

At operation 1002, the system can get the property names from a first database and a second database. At operation 1004, the system can determine one or more distance metrics (e.g., Levenshtein distance). At decision point 1006, the system can determine, for each property name in the first database, if there is an identical property name in the second database. If so, the system can map the properties having identical names at operation 1008. For example, if the first database has a property named "First_Name" and the second database also has a property named "First_Name," the system can map these two properties. At operation 1010, the system can determine similarity between properties in the first database and properties in the second databased based on the distance metrics. For example, properties with smaller Levenshtein distances can be more likely to be related than properties with larger Levenshtein distances. At decision point 1012, the system can determine whether a matching confidence is above a threshold. The matching confidence can be based on, for example, an absolute distance metric (e.g., Levenshtein distance between two property names) and/or a relative distance metric (e.g., Levenshtein distance between two property names relative to the other Levenshtein distances between a property name and other property names). In some implementations, a property may not be mapped if the Levenshtein distance exceeds a threshold value and/or if there are multiple possible property mappings with similar or the same Levenshtein distance. For example, the Levenshtein distance between "FirstName" and "FirstOrder" is four, and the distance between "FirstName" and "GivenName" is also four. Thus, a confidence in mapping FirstName to either FirstOrder or GivenName can be low. If the confidence is above the threshold, the system can map the properties at operation 1008. If not, the system can determine candidate matches at operation 1014. The candidate matches can be, for example, all properties with a certain distance metric, all properties with similar distance metrics, all properties within a confidence threshold, etc. At operation 1016, the system can confirm the matches. For example, the system can present candidate matches to a user, and the user can select the correct mapping. At operation 1008, the system can map the properties.

Figure 11:
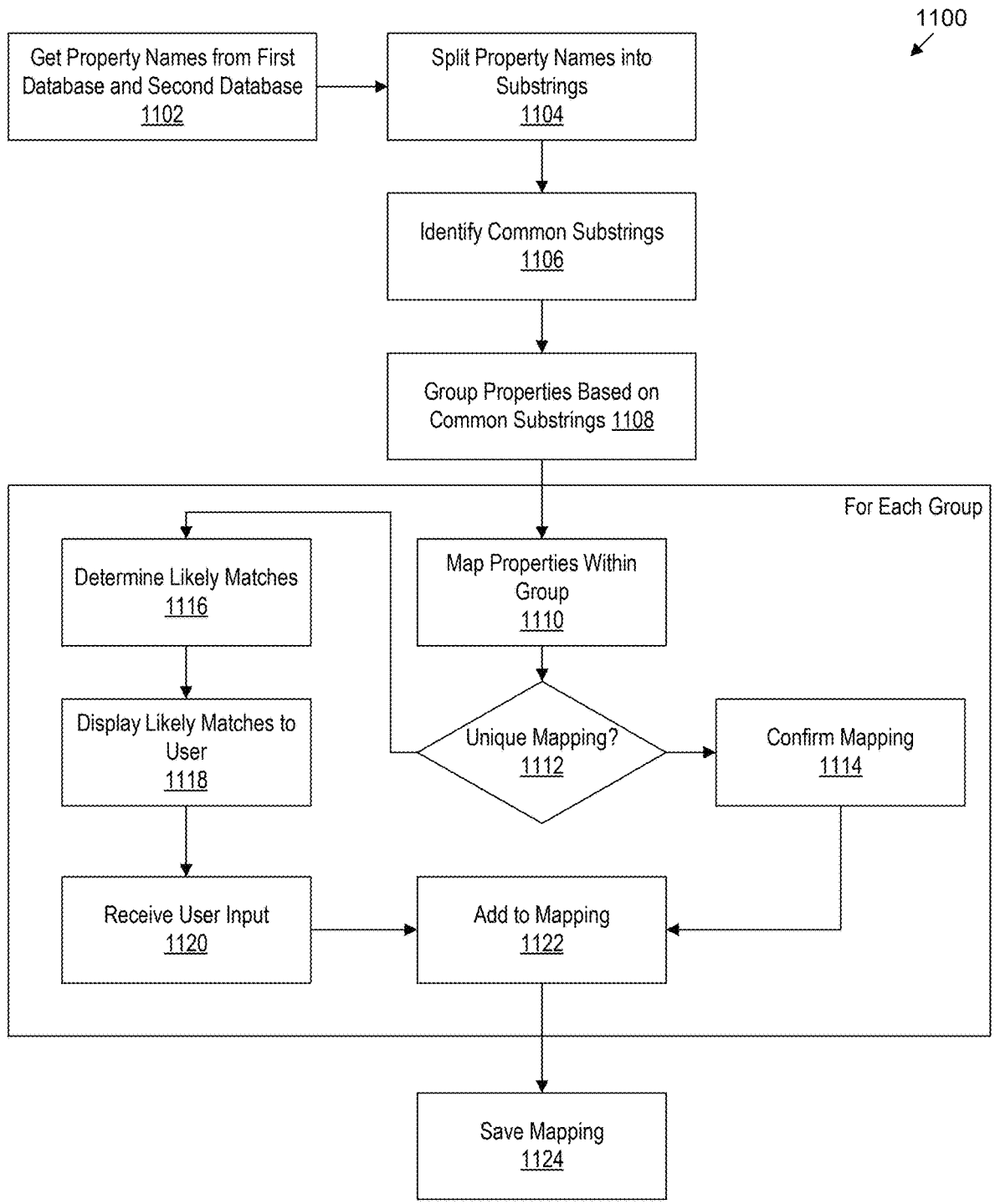
FIG. 11 is a block diagram that illustrates an example process for mapping properties between databases using substring analysis according to some implementations.

FIG. 11 is a block diagram that illustrates an example process for mapping properties between databases using substring analysis according to some implementations. The process 1100 can be performed by a computer system. For simplicity, two databases are described, but the process 1100 can be readily applied to any number of databases.

At operation 1102, the system can get property names from a first database and a second database. At operation 1104, the system can split property names into substrings. For example, property names can be split by dictionary word, special characters, etc. At operation 1106, the system can identify common substrings. For example, a common substring in the first database and/or the second database can be "Shipping" (e.g., used in the names of properties describing shipping addresses) or "Name" (e.g., as used for properties storing a first name, middle name, last name, business name, etc.). At operation 1108, the system can group properties based on common substrings. Within each group, the system can, at operation 1110, map properties within the group, for example based on substrings within the group. For example, a "Name" group can include "First" and "Last" within the group. In some cases, there can be a unique (e.g., 1:1) mapping between properties within a group between properties of the first database and properties of the second database. If there is a unique mapping, at operation 1114, the system can confirm the mapping (e.g., the system can display the mapping to a user, and the user can confirm the mapping). At operation 1122, the properties can be added to a mapping of database properties between the first database and the second database. If, at decision point 1112, there is not a unique mapping, the system can, at operation 1116, determine likely matches (for example, based on similarity of property names, distance metrics, etc.). At operation 1118, the system can cause the likely matches to be displayed to the user. At operation 1120, the system can receive user input indicating the mapping. At operation 1122, the mapping can be updated to include the properties. At operation 1124, the system can save the mapping.

Figure 12:
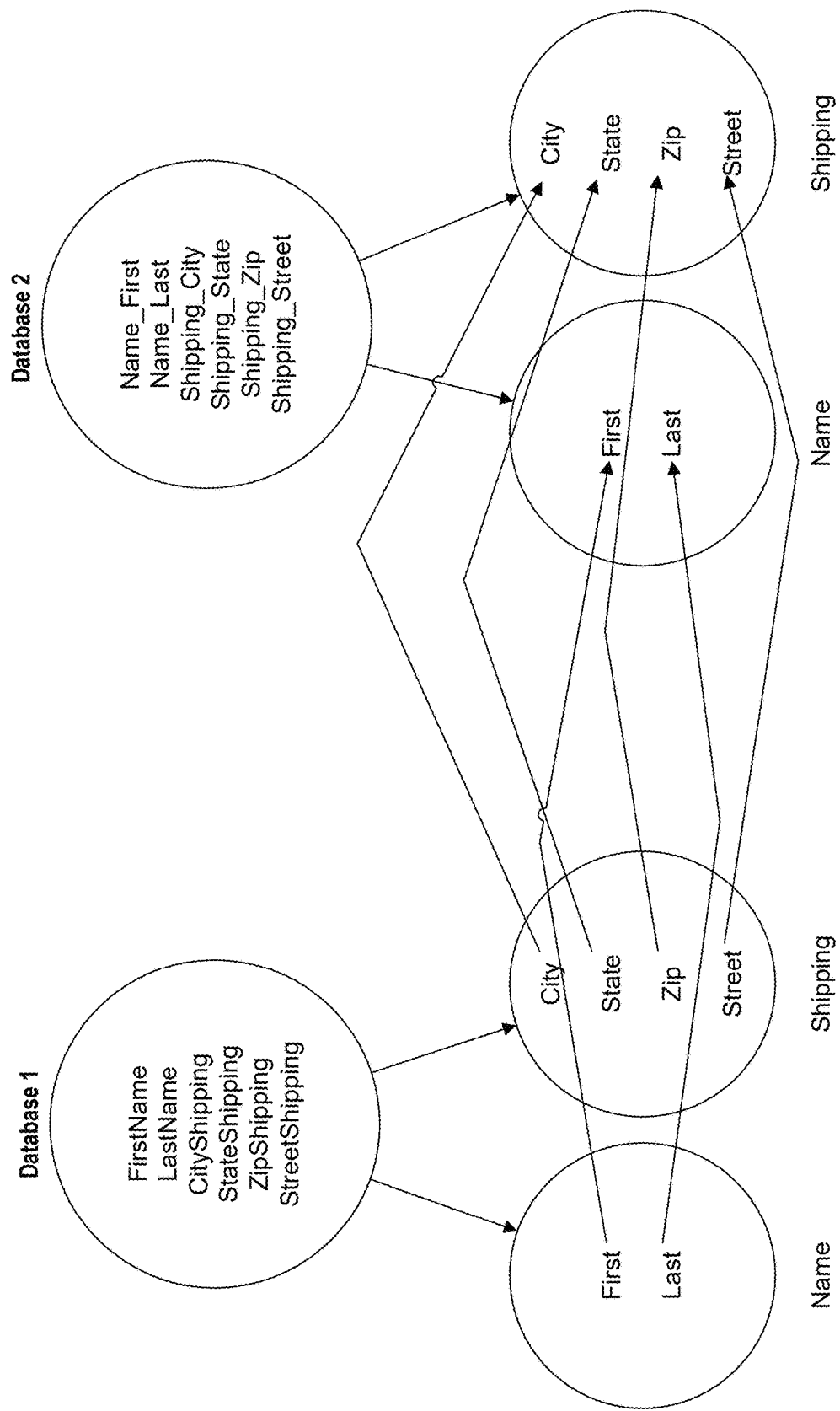
FIG. 12 is a diagram that schematically illustrates database harmonization according to some implementations.

FIG. 12 schematically illustrates the process of FIG. 11 according to some implementations. In FIG. 12, there is a 1:1 mapping between properties in the first database (Database 1) and the second database (Database 2). The property names in the first database can be divided into groups based on shared substrings (e.g., "Name" and "Shipping"). The non-shared substrings can be placed into the groups (e.g., "First" and "Last" can be placed in the "Name" group and "City," "State," "Zip," and "Street" can be placed in the "Shipping" group). The same approach can be carried out on the second database. The properties in the Name group for the first database can be mapped to properties in the Name group for the second database, and the properties in the Shipping group of the first database can be mapped to properties in the Shipping group of the second database. In this way, a final mapping between the first database and the second database can be obtained. For example, the mapping in FIG. 12 can be: {FirstName:Name_First; LastName: Name_Last; CityShipping:Shipping_City; StateShipping: Shipping_State; ZipShipping:Shipping_Zip; StreetShipping:Shipping_Street}.

Figure 13:
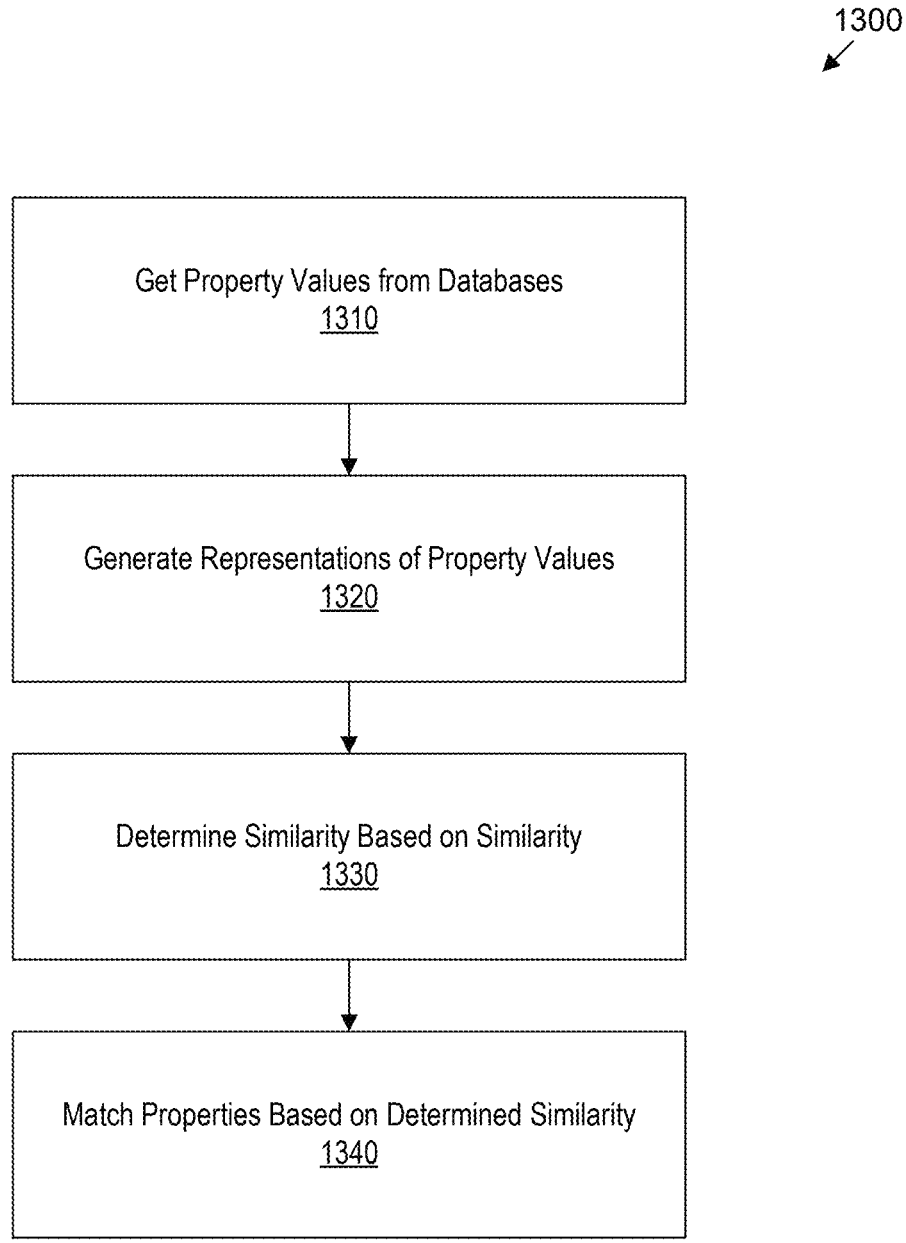
FIG. 13 is a block diagram that illustrates an example database harmonization process according to some implementations.

FIG. 13 is a block diagram that illustrates an example database harmonization process according to some implementations. The process 1300 can be carried out by a computer system. At operation 1310, the system can get property values from a plurality of databases. At operation 1320, the system can generate representations of the property values. The representations can provide information such as, for example and without limitation, data type (e.g., date, string, numeric, etc.), length, population rate (e.g., percentage of blocks in a database that contain values for the property), common words (for example, property that includes words such as "Street" and "Avenue" may indicate that a property is part of an address). At operation 1330, the system can, based on the representations, determine similarity of properties based on the property value representations. At operation 1340, the system can match properties in different databases based on the determined similarity.

Figure 14:
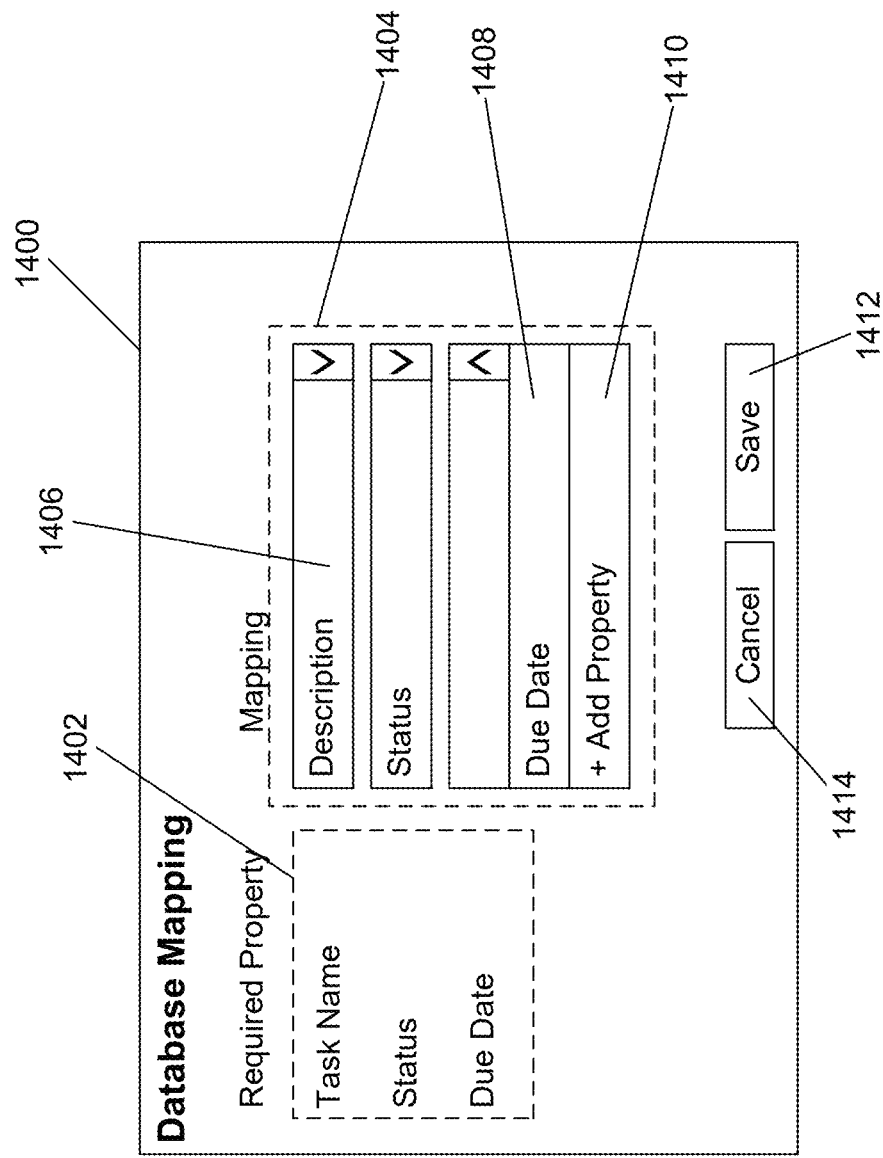
FIG. 14 is a diagram that schematically illustrates an example user interface 1400 according to some implementations.

FIG. 14 is a diagram that schematically illustrates an example user interface 1400 according to some implementations. The user interface 1400 can be used to manually map one or more properties. In FIG. 14, a task database aggregation is illustrated. A task database can have required core properties 1402 of "Task Name," "Status," and "Due Date" in the illustrated example. In some implementations, a system can attempt to automatically map properties in a selected database to the required core properties, for example using the approaches described herein. The interface can include a mapping selection section 1404 that allows a user to select properties within a database that should be mapped to the required core properties. The user interface can include dropdowns 1406 for selecting properties. When a user selects a dropdown 1406, the system can display a list of properties 1408. In some implementations, the list can be organized such that only candidate properties identified by the system are displayed, or so that candidate properties are displayed at the top of the list. In some implementations, the system can include an add property user interface element 1410 that allows the user to add a property to the database. Such functionality can be useful if, for example, the database does not have a property to map to a required core property. The user can add a property without having to exit the user interface 1400. The user interface 1400] can include a save button 1412 that allows the user to save the mapping. The user interface 1400 can include a cancel button 1414 that allows the user to cancel the mapping. In some implementations, one or more of the dropdowns 1406 can be automatically populated, for example if there is an exact match between a required core property name and a property name of a property in the database.

Figure 15:
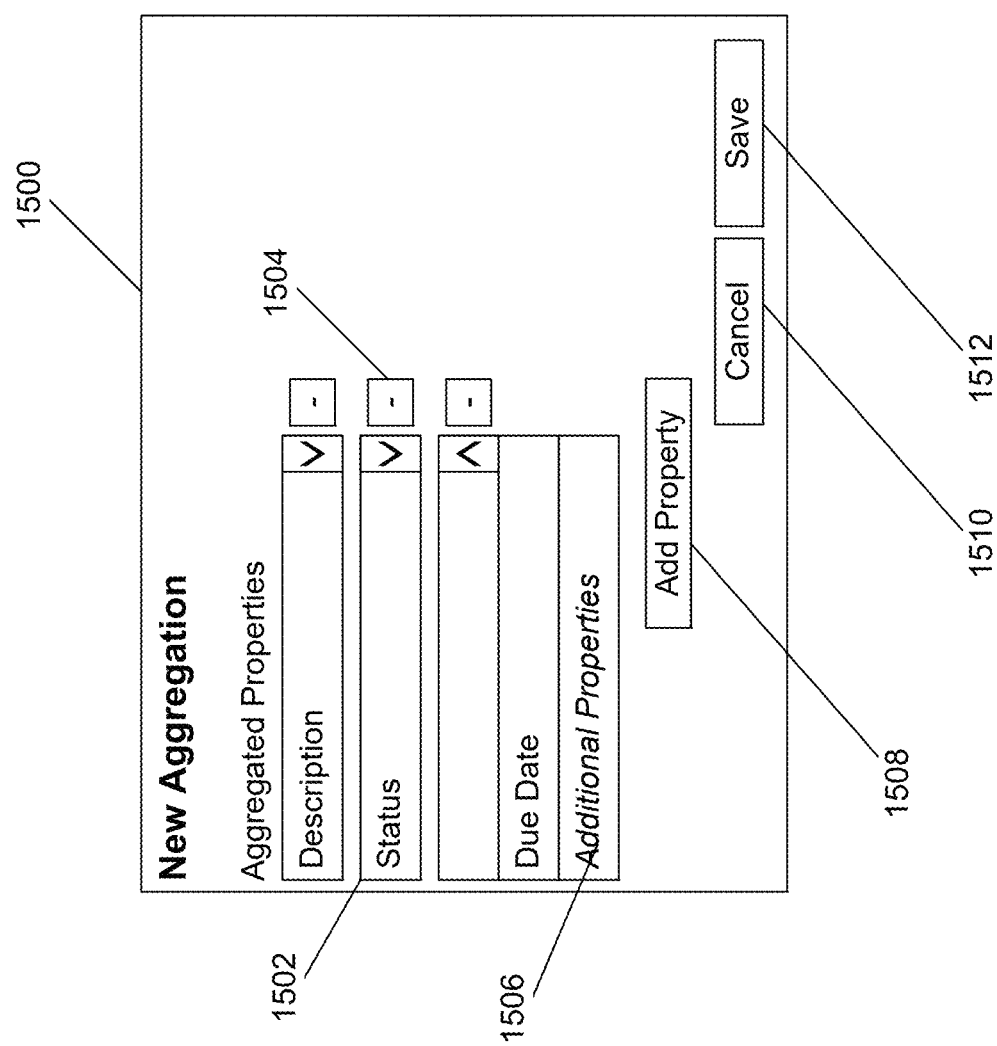
FIG. 15 is a diagram that schematically illustrates an example user interface 1500 according to some implementations.

FIG. 15 is a diagram that schematically illustrates an example user interface 1500 according to some implementations. The user interface 1500 can be used to configure an aggregated view, for example to select properties that are shown in an aggregated view. The user interface 1500 can include dropdowns remove buttons 1502 for selecting one or more properties to show in the aggregated view. In some implementations remove buttons 1502 can be automatically populated with required core properties and/or with other suggested properties (e.g., optional core properties and/or user-defined properties). In some implementations, the remove buttons 1502 can include an option 1506 to select a property that is not shown by default in the remove buttons 1502. For example, in some implementations, a dropdown list can by default be configured to show required core properties, optional core properties that are populated in more than a threshold percentage of database records (e.g., blocks), user-defined properties that are populated in more than a threshold percentage of database records (e.g., blocks), etc., and the user can select the option 1506 to choose one or more properties not shown in the dropdown by default. The user interface 1500 can include remove buttons 1504 that can be used to remove a property from the aggregated view. The user interface 1500 can include an add button 1508 that can be used to add a property to the aggregated view. For example, if three properties are included in the aggregated view, a user can add a fourth property by selecting the add button 1508. The user interface 1500 can include a cancel button 1510 to close the user interface 1500 without saving and a save button 1512 for saving the aggregated view configuration.

Figure 16:
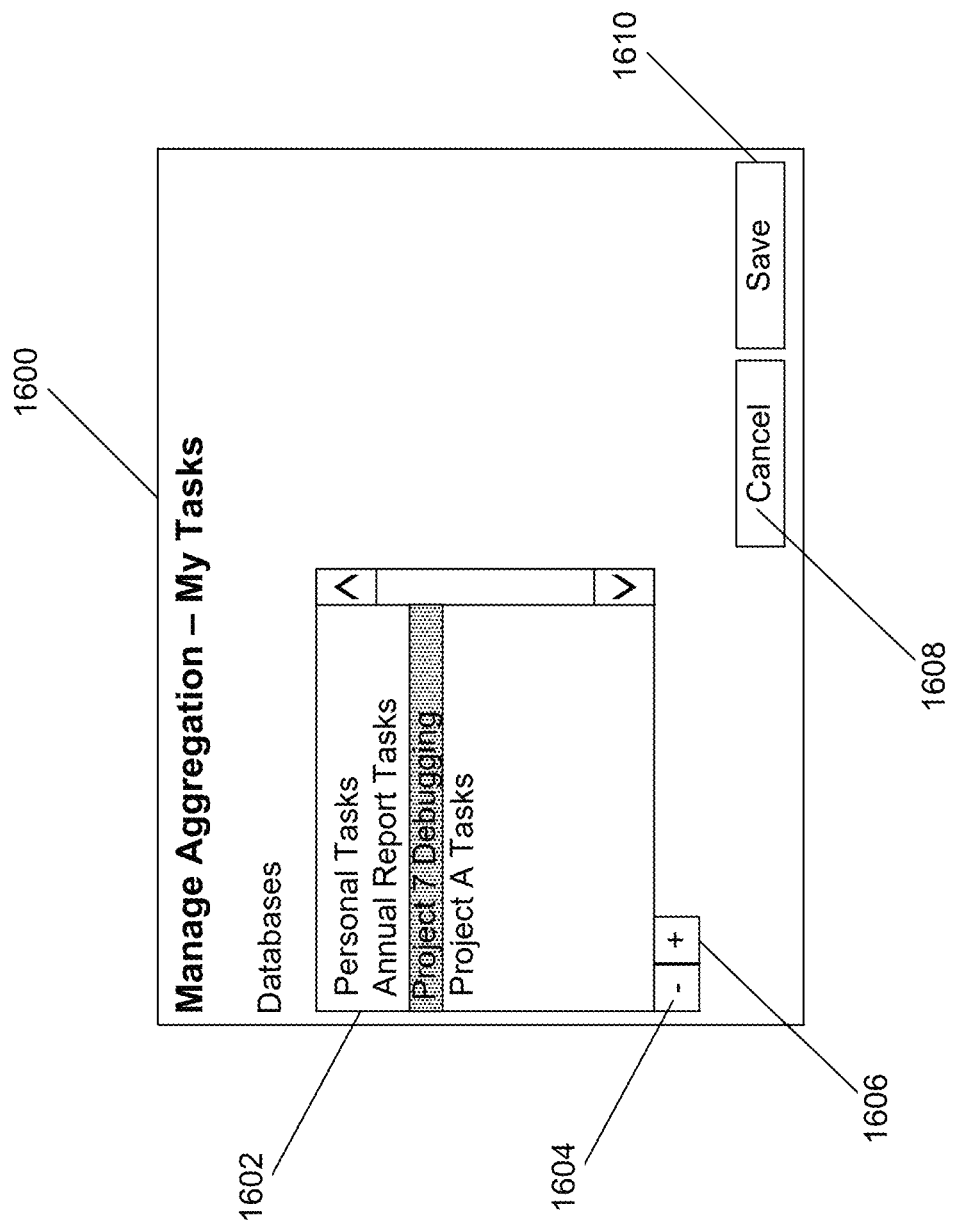
FIG. 16 is a diagram that schematically illustrates an example user interface according to some implementations.

FIG. 16 is a diagram that schematically illustrates an example user interface 1600 according to some implementations. The user interface 1600 can be used to manage an aggregated view by adding and/or removing databases from the aggregated view. The user interface 1600 can include a list 1602 that shows the databases included in the aggregated view. The user interface 1600 can include a button 1604 that can enable a user to remove a selected database from the aggregated view. The user interface 1600 can include a button 1606 that can be used to add a database to the aggregated view. In some implementations, the 1600 can be configured to display the name of the aggregated view (e.g., "My Tasks"). The user interface 1600 can include a button 1608 that can enable a user to close the 1600 without saving. The user interface 1600 can include a button 1610 that can enable a user to save changes to the aggregated view.

Computer System

Figure 17:
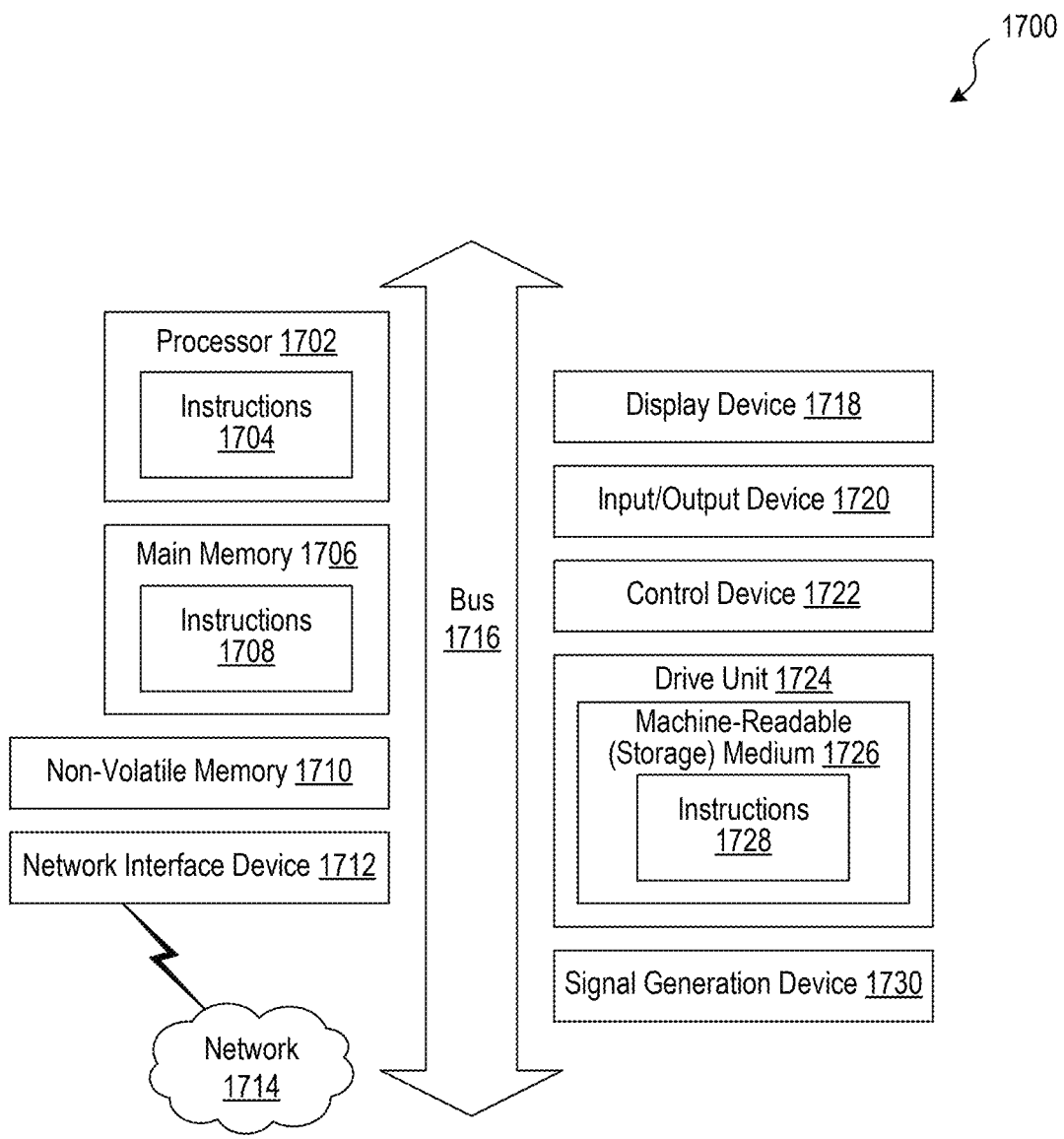
FIG. 17 is a block diagram that illustrates an example of a computer system 1700 in which at least some operations described herein can be implemented.

FIG. 17 is a block diagram that illustrates an example of a computer system 1700 in which at least some operations described herein can be implemented. As shown, the computer system 1700 can include: one or more processors 1702, main memory 1706, non-volatile memory 1710, a network interface device 1712, a display device 1718, an input/output device 1720, a control device 1722 (e.g., keyboard and pointing device), a drive unit 1724 that includes a machine readable (storage) medium 1726, and a signal generation device 1730 that are communicatively connected to a bus 1716. The bus 1716 represents one or more physical buses and/or point-to-point connections that are connected by appropriate bridges, adapters, or controllers. Various common components (e.g., cache memory) are omitted from FIG. 17 for brevity. Instead, the computer system 1700 is intended to illustrate a hardware device on which components illustrated or described relative to the examples of the figures and any other components described in this specification can be implemented.

The computer system 1700 can take any suitable physical form. For example, the computer system 1700 can share a similar architecture as that of a server computer, personal computer (PC), tablet computer, mobile telephone, wearable electronic device, network-connected ("smart") device (e.g., a television or home assistant device), AR/VR system (e.g., head-mounted display), or any electronic device capable of executing a set of instructions that specify action(s) to be taken by the computer system 1700. In some implementations, the computer system 1700 can be an embedded computer system, a system-on-chip (SOC), a single-board computer (SBC) system, or a distributed system such as a mesh of computer systems or include one or more cloud components in one or more networks. Where appropriate, one or more computer systems 1700 can perform operations in real time, near real time, or in batch mode.

The network interface device 1712 enables the computer system 1700 to mediate data in a network 1714 with an entity that is external to the computer system 1700 through any communication protocol supported by the computer system 1700 and the external entity. Examples of the network interface device 1712 include a network adapter card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1706, non-volatile memory 1710, machine-readable medium 1726) can be local, remote, or distributed. Although shown as a single medium, the machine-readable medium 1726 can include multiple media (e.g., a centralized/distributed database and/or associated caches and servers) that store one or more sets of instructions 1728. The machine-readable medium 1726 can include any medium that is capable of storing, encoding, or carrying a set of instructions for execution by the computer system 1700. The machine-readable medium 1726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1704, 1708, 1728) set at various times in various memory and storage devices in computing device(s). When read and executed by the processor 1702, the instruction(s) cause the computer system 1700 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A computer-implemented method comprising:
   identifying a plurality of databases in a scope, to be included in an aggregated view,
      wherein each database of the plurality of databases comprises data used to populate one or more blocks of an integrated workspace,
      wherein each block comprises one or more properties,
      wherein the one or more properties comprise at least one common property included in blocks of each database of the plurality of databases, and
      wherein the scope is a grouping of hierarchically organized blocks of a render tree, wherein the render tree defines relationships between a first block of the hierarchically organized blocks and one or more child blocks;
   retrieving one or more blocks associated with each database of the plurality of databases;
   harmonizing a first database of the plurality of databases and a second database of the plurality of databases by determining a mapping of one or more of the first database to one or more properties of the second database;
   generating the aggregated view of the one or more blocks, the aggregated view including the at least one common property; and
   causing display of the aggregated view in a page, the display including the at least one common property.

2. The method of claim 1, wherein the aggregated view includes, for at least one block of the one or more blocks, a user interface element that, when selected by a user, causes display of the block including at least one property of the one or more properties that is not shown in the aggregated view.

3. The computer-implemented method of claim 1, wherein the one or more databases comprise at least one user-defined database.

4. The computer-implemented method of claim 3, wherein the at least one user-defined database comprises a user-defined database type.

5. The computer-implemented method of claim 1, wherein identifying the plurality of databases comprises determining a plurality of databases having a same database type.

6. The computer-implemented method of claim 5, further comprising:
   detecting a creation of a new database having a database type that is the same as the database type of the plurality of databases; and
   adding the new database to the aggregated view.

7. The computer-implemented method of claim 1, wherein harmonizing the first database and the second database comprises:
   generating a user interface for mapping the one or more properties of the first database to the one or more properties of the second database;
   causing display of the user interface on a computer system available to the user;
   receiving an input from the user via the user interface, the input indicating the mapping of the one or more properties of the first database to the one or more properties of the second database; and
   storing the mapping, wherein the mapping is used to display at least two properties in a same column in the aggregated view.

8. The computer-implemented method of claim 1, wherein harmonizing the first database and the second database is based on at least one of property names or property values.

9. The computer-implemented method of claim 1, wherein harmonizing the first database and the second database comprises:
   determining, for each property of the one or more properties of the first database, a distance metric between a property name of the property and property names of each of the one or more properties of the second database; and
   selecting, for each property of the one or properties of the first database based on the distance metric, a matching property of the one or more properties of the second database.

10. The computer-implemented method of claim 1, wherein harmonizing the first database and the second database comprises:
   determining, for property names of the one or more properties of the first database, one or more repeated first substrings;
   determining, for property names of the one or more properties of the second database, one or more repeated second substrings;
   grouping the one or of more properties of the first database into one or more first groups, each first group having a first label, the first labels corresponding to the one or more repeated first substrings;
   grouping the one or more properties of the second database into one or more second groups, each second group having a second label, the second labels corresponding to the one or more repeated second substrings;
   mapping, based on the first labels and the second labels, each group the one or more first groups to a group of the one or more second groups; and
   within each group of the first groups, mapping each property to a corresponding property in the mapped group of the one or more second groups.

11. The computer-implemented method of claim 1, wherein harmonizing the first database and the second database comprises:
 determining one or more common substrings from property names of the one or more properties of the first database and the one or more properties of the second database;
 removing the one or more common substrings from the property names to generate second substrings; and
 mapping the one or more properties of the first database to the one or more properties of the second database based on the generated second substrings.

12. A non-transitory, computer-readable storage medium comprising instructions recorded thereon, wherein the instructions, when executed by at least one data process of a system, cause the system to perform a method comprising:
 identifying a plurality of databases in a scope, to be included in an aggregated view,
  wherein each database of the plurality of databases comprises data used to populate one or more blocks of an integrated workspace,
  wherein each block comprises one or more properties,
  wherein the one or more properties comprise at least one common property included in blocks of each database of the plurality of databases, and
  wherein the scope is a grouping of hierarchically organized blocks of a render tree, wherein the render tree defines relationships between a first block of the hierarchically organized blocks and one or more child blocks;
 retrieving one or more blocks associated with each database of the plurality of databases;
 harmonizing a first database of the plurality of databases and a second database of the plurality of databases by determining a mapping of one or more of the first database to one or more properties of the second database;
 generating the aggregated view of the one or more blocks, the aggregated view including the at least one common property; and
 causing display of the aggregated view in a page, the display including the at least one common property.

13. The non-transitory, computer-readable storage medium of claim 12, wherein the aggregated view includes, for at least one block of the one or more blocks, a user interface element that, when selected by a user, causes display of the block including at least one property of the one or more properties that is not shown in the aggregated view.

14. The non-transitory, computer-readable storage medium of claim 12, wherein identifying the plurality of databases comprises determining a plurality of databases having a same database type.

15. The non-transitory, computer-readable storage medium of claim 14, wherein the instructions are further configured to cause the system to:
 detect a creation of a new database having a database type that is the same as the database type of the plurality of databases; and
 add the new database to the aggregated view.

16. The non-transitory, computer-readable storage medium of claim 12, wherein harmonizing the first database and the second database comprises:
 generating a user interface for mapping the one or more properties of the first database to the one or more properties of the second database;
 causing display of the user interface on a computer system available to the user;
 receiving an input from the user via the user interface, the input indicating the mapping of the one or more properties of the first database to the one or more properties of the second database; and
 storing the mapping, wherein the mapping is used to display at least two properties in a same column in the aggregated view.

17. The non-transitory, computer-readable storage medium of claim 12, wherein harmonizing the first database and the second database is based on at least one of property names or property values.

18. The non-transitory, computer-readable storage medium of claim 12, wherein harmonizing the first database and the second database comprises:
 determining, for each property of the one or more properties of the first database, a distance metric between a property name of the property and property names of each of the one or more properties of the second database; and
 selecting, for each property of the one or properties of the first database based on the distance metric, a matching property of the one or more properties of the second database.

19. The non-transitory, computer-readable storage medium of claim 12, wherein harmonizing the first database and the second database comprises:
 determining, for property names of the one or more properties of the first database, one or more repeated first substrings;
 determining, for property names of the one or more properties of the second database, one or more repeated second substrings;
 grouping the one or of more properties of the first database into one or more first groups, each first group having a first label, the first labels corresponding to the one or more repeated first substrings;
 grouping the one or more properties of the second database into one or more second groups, each second group having a second label, the second labels corresponding to the one or more repeated second substrings;
 mapping, based on the first labels and the second labels, each group the one or more first groups to a group of the one or more second groups; and
 within each group of the first groups, mapping each property to a corresponding property in the mapped group of the one or more second groups.

20. The non-transitory, computer-readable storage medium of claim 12, wherein harmonizing the first database and the second database comprises:
 determining one or more common substrings from property names of the one or more properties of the first database and the one or more properties of the second database;
 removing the one or more common substrings from the property names to generate second substrings; and
 mapping the one or more properties of the first database to the one or more properties of the second database based on the generated second substrings.

* * * * *